United States Patent
Canich et al.

(10) Patent No.: US 10,253,173 B2
(45) Date of Patent: Apr. 9, 2019

(54) POLYMER COMPOSITIONS AND PROCESSES FOR THEIR PRODUCTION

(71) Applicant: ExxonMobil Chemical Patents Inc., Baytown, TX (US)

(72) Inventors: Jo Ann M. Canich, Houston, TX (US); Rainer Kolb, Kingwood, TX (US); Periagaram S. Ravishankar, Kingwood, TX (US); Phillip T. Matsunaga, Houston, TX (US); Peijun Jiang, League City, TX (US); Rhutesh K. Shah, Katy, TX (US); Narayanaswami Dharmarajan, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/538,137

(22) PCT Filed: Dec. 28, 2015

(86) PCT No.: PCT/US2015/067586
§ 371 (c)(1),
(2) Date: Jun. 20, 2017

(87) PCT Pub. No.: WO2016/114915
PCT Pub. Date: Jul. 21, 2016

(65) Prior Publication Data
US 2018/0002516 A1  Jan. 4, 2018

Related U.S. Application Data

(60) Provisional application No. 62/103,372, filed on Jan. 14, 2015.

(51) Int. Cl.
| | | |
|---|---|---|
| *C08L 23/16* | (2006.01) | |
| *C08L 23/08* | (2006.01) | |
| *C08F 4/76* | (2006.01) | |
| *C08F 210/06* | (2006.01) | |
| *C08F 210/18* | (2006.01) | |
| *C08F 210/16* | (2006.01) | |
| *C08F 4/659* | (2006.01) | |

(52) U.S. Cl.
CPC ............ *C08L 23/16* (2013.01); *C08F 4/76* (2013.01); *C08F 210/06* (2013.01); *C08F 210/16* (2013.01); *C08F 210/18* (2013.01); *C08F 4/65908* (2013.01); *C08F 2500/09* (2013.01); *C08F 2500/17* (2013.01); *C08L 2205/02* (2013.01); *C08L 2205/025* (2013.01); *C08L 2205/06* (2013.01); *C08L 2207/07* (2013.01); *C08L 2312/04* (2013.01); *C08L 2314/06* (2013.01)

(58) Field of Classification Search
CPC ............... C08L 23/16; C08L 2314/06; C08L 2205/025; C08L 2207/07
See application file for complete search history.

(56) References Cited

U.S. PATENT DOCUMENTS

| 6,506,857 | B2 | 1/2003 | Rix |
| 7,223,822 | B2 | 5/2007 | Abhari et al. |
| 8,318,998 | B2 | 11/2012 | Crowther et al. |
| 8,829,127 | B2 | 9/2014 | Dharmarajan et al. |
| 2003/0236363 | A1 | 12/2003 | Ravishankar |
| 2004/0214953 | A1 | 10/2004 | Yamada et al. |
| 2007/0117946 | A1 | 5/2007 | Schwab et al. |
| 2008/0287620 | A1 | 11/2008 | Ravishankar |
| 2012/0245311 | A1 | 9/2012 | Crowther et al. |
| 2012/0245313 | A1* | 9/2012 | Crowther ............ B01J 31/2295 526/134 |
| 2013/0029125 | A1* | 1/2013 | Tse ........................ C08L 23/04 428/220 |
| 2014/0051809 | A1 | 2/2014 | Tse |
| 2014/0179872 | A1* | 6/2014 | Fiscus ................... C08F 210/16 525/240 |
| 2014/0213734 | A1 | 7/2014 | Jiang |
| 2015/0025209 | A1 | 1/2015 | Canich et al. |

FOREIGN PATENT DOCUMENTS

| JP | 08239416 A | 9/1996 |
| JP | 2014-214204 A | 11/2014 |
| JP | 6161143 B | 7/2017 |
| WO | 2009/082451 A | 7/2009 |
| WO | 2009/094348 A | 7/2009 |
| WO | 2012/112259 A | 8/2012 |
| WO | 2015/009474 A | 1/2015 |
| WO | 2015/009832 A | 1/2015 |
| WO | 2016/114914 A | 7/2016 |
| WO | 2016/114916 A | 7/2016 |

* cited by examiner

Primary Examiner — Robert D. Harlan

(57) ABSTRACT

Provided herein are polymerization processes and polymer compositions including reactor blends formed by such polymerization processes. The polymerization processes include copolymerization using two metallocene catalyst systems: the first catalyst system capable of producing polymers having 60% or more vinyl terminations, the second catalyst system capable of producing high molecular weight polymers, preferably incorporating at least some of the polymers produced by the first catalyst system into the high molecular weight polymers. The reactor blends formed thereby therefore include first and second copolymer components, which may differ in monomer content and weight-average molecular weight (Mw). Furthermore, the reactor blends may exhibit advantageous rheological properties, at least some of which are consistent with long-chain branching. Preferred reactor blends comprise ethylene-propylene-diene (EPDM) terpolymers.

15 Claims, 14 Drawing Sheets

3-dimethylamino-
1,3-azaborollide 2-dimethylamino-
1,2-oxaborollide 2-dimethylamino-
1,2-thiaborollide azacyclopentadienyl phosphacyclopentadienyl arsacyclopentadienyl stibacyclopentadienyl boracyclopentadienyl 1-dimethylamino-
boratabenzene 4-dimethylamino-
1,4-phosphaboratabenzene 2-dimethylamino-
1,2-azaboratabenzene 3-dimethylamino-
1,3-benzothiaborollide 2-dimethylamino-
1,2-benzothiaborollide 3a,7a-azaborindenyl cyclopenta[*b*]pyridyl cyclopenta[*c*]pyridyl cyclopenta[*c*]phosphinyl cyclopenta[*b*]phosphinyl indeno[1,2-*c*]pyridyl          indeno[1,2-*c*]phosphinyl cyclopenta[*g*]quinolyl         cyclopenta[*g*]isoquinolyl

POLYMER COMPOSITIONS AND PROCESSES FOR THEIR PRODUCTION

PRIORITY CLAIM

This application is a National Phase Application claiming priority to PCT Application Serial No. PCT/US2015/067586 filed Dec. 28, 2015, and claims priority to and the benefit of U.S. Ser. No. 62/103,372, filed Jan. 14, 2015, the entireties of which are both hereby incorporated by their reference.

FIELD OF THE INVENTION

This invention relates to the use of one or more metallocene catalysts or catalyst systems to produce high molecular weight, long chain branched copolymers, and the copolymers so produced.

BACKGROUND OF THE INVENTION

Copolymers, and particularly copolymer and terpolymers rubbers (e.g., ethylene-propylene (EP) rubbers and ethylene/α-olefin/diene rubbers such as ethylene-propylene-diene rubbers (EPDM) rubbers), produced using conventional Ziegler-Natta catalysts based on transition metals may have long chain branching structures. The presence of long-chain branching may lead to improved processability and some improved end-use properties for certain copolymer and terpolymers rubbers such as EP and EPDM rubbers. For instance, long chain branching may result in polymers exhibiting improved melt elasticity, and/or improved shear thinning (indicating polymer that is highly viscous at low shear rates, but less viscous at higher shear rates associated with processing of polymers such as extrusion). However, traditional Ziegler-Natta catalyzed rubbers (e.g., znEPDM) typically have a broader composition distribution (CD), such as a broader inter-chain distribution of ethylene-derived units, which may result in undesirably higher crystallinity. This could impact elasticity properties of rubbers, and/or processability of such rubbers. In addition, Ziegler-Natta processes are frequently more expensive than newer technologies, such as metallocene-based processes.

Metallocene-based copolymers and terpolymers frequently exhibit desirably narrow CD. However, such copolymers and terpolymers typically lack long chain branching, and have narrower molecular weight distribution (MWD), which may adversely affect the performance and processability of metallocene-based copolymer rubbers such as metallocene-based EP rubber (mEP) and metallocene-based EPDM rubber (mEPDM).

Although many metallocene-based copolymers have been reported, such copolymers frequently lack one or more of the desired high molecular weight, large MWD, high CD, and high degree of long chain branching, and/or desired rheological properties frequently associated with long chain branching, particularly in metallocene-based copolymer rubbers such as mEP or mEPDM rubbers.

Along these and similar lines, some relevant publications include those identified in Paragraphs [0005]-[0011] in US Patent Publication No. US 2015/0025209 (incorporated by reference herein); the publications identified in Paragraph [0004] of WIPO Publication No. WO 2015/009832 (incorporated by reference herein); and also the following: US Patent Publication Nos. 2012/0245311, 2014/0051809; U.S. Pat. Nos. 6,506,857, 8,318,998, 8,829,127; and Japan unexamined patent publication Hei 8-239416.

The reported processes and polymers leave much to be desired in terms of the sought-after properties of metallocene copolymers, particularly copolymer rubbers such as mEP and mEPDM. Processes are not known for the production on a commercial scale of metallocene polymer compositions having high Mw, high MWD, and/or desired rheological properties sufficient to compete with more expensive Ziegler-Natta catalyzed polymer compositions. Nor are processes known to produce copolymers such as terpolymers having high Mw, long chain branching, and/or controlled molecular structures incorporating such long-chain branching in a targeted manner, and/or with tuned branch structure and/or composition (e.g., comb-type copolymers with amorphous backbones and semi-crystalline branches, comb-type polymers with semi-crystalline backbones and amorphous branches, copolymers with controlled distribution of diene monomers and/or other monomers, copolymers with controlled branch-length, and the like). Such polymer compositions, for example mEPDM polymer compositions, would be particularly useful for a variety of applications, including traditional EPDM applications in addition to applications such as viscosity index improvers, wire and cable coating, thermoplastic vulcanizate feedstock, tires, and the like.

SUMMARY OF THE INVENTION

The invention relates to polymerization processes for producing polymer compositions, and the polymer compositions produced thereby. In particular aspects, the polymerization process includes copolymerizing a plurality of monomers using a multiple catalyst system comprising: (i) a vinyl-terminated polymer (VTP) catalyst system comprising a VTP catalyst compound and one or more activators, and (ii) a high molecular-weight polymer (HMP) catalyst system comprising a HMP catalyst compound and one or more activators (which may be the same or different in whole or in part from the VTP catalyst system activators). The VTP catalyst system is capable of producing vinyl-terminated polymers (VTPs) from at least a portion of the plurality of monomers, which polymers are characterized in that they possess a high amount of vinyl terminations (at least 60% relative to the total number of polymer chain-end unsaturations in the VTP). The HMP catalyst system is capable of producing high molecular weight (Mw greater than 50,000 g/mol) copolymers. In addition, in some particular embodiments, the HMP catalyst may further be capable of incorporating one or more vinyl-terminated polymers (such as those formed by the VTP catalyst system) into the HMP produced polymer chain (the HMP incorporating one or more VTPs sometimes being termed a "HMP-VTP").

The plurality of monomers includes at least: (1) a first $C_2$-$C_{20}$ α-olefin; (2) a second $C_2$-$C_{20}$ α-olefin different from the first; and, optionally, (3) one or more dienes. In particular aspects, the plurality of monomers includes ethylene; a second $C_3$-$C_{20}$ α-olefin such as propylene and/or butene; and, optionally, one or more dienes.

VTP catalyst compounds in particular aspects include metallocenes represented by the formula:

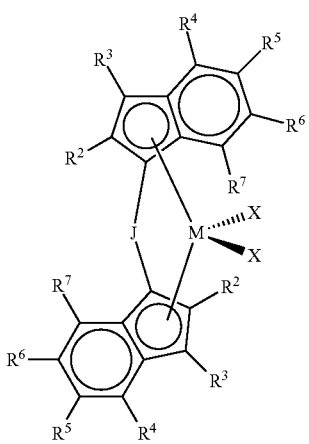

where: (1) J is a divalent bridging group comprising C, Si or both; (2) M is a group 4 transition metal (preferably Hf); (3) each X is independently a univalent anionic ligand, or two Xs are joined and bound to the metal atom to form a metallocycle ring, or two Xs are joined to form a chelating ligand, a diene ligand, or an alkylidene ligand; and (4) each of $R^2$, $R^3$, $R^4$, $R^5$, $R^6$, and $R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may optionally be bonded together to form a saturated or partially saturated cyclic or fused ring structure.

HMP catalyst compounds according to some aspects are transition metal complexes such as mono-cyclopentadienyl (mono-Cp) amido group 4 complexes, bridged fluorenyl-Cp group 4 complexes, biphenyl phenol (BPP) transition metal complexes, pyridyl amide transition metal complexes, and/or pyridyl diamide transition metal complexes.

Suitable activators for any catalyst compound described herein include non-coordinating anion (NCA) activators, alumoxanes, or any combination thereof.

The invention also relates to variations of the multiple catalyst processes. For instance, a serial polymerization process may be utilized, wherein a first plurality of monomers is contacted with the VTP catalyst system in a first polymerization zone to produce a first reaction product. The first reaction product includes one or more VTPs. The first reaction product, optionally along with one or more additional monomers (which may be the same or different from those of the first plurality of monomers), are then copolymerized using the HMP catalyst system in a second polymerization zone in the presence of the first reaction to product, which may or may not be incorporated into the polymer chain. The polymer composition produced by such polymerization processes may comprise a reactor blend of VTPs and/or HMPs, preferably both. Further, at least a portion of the HMPs preferably comprise HMP-VTPs. In certain aspects, such polymer compositions are formed by copolymerizing ethylene, propylene, and one or more non-conjugated polyenes with the dual catalyst system. Thus, particular embodiments comprise reactor blends of two or more polymers selected from (a) a first copolymer comprising formed by reacting ethylene, $C_3$-$C_{20}$ alpha-olefin, and optionally one or more dienes, where said copolymer has a reacted ethylene content in a range of 20 to 80 wt %, and (b) a second copolymer formed by reacting ethylene, $C_3$-$C_{20}$ alpha-olefin, and optionally one or more dienes, wherein said copolymer has a reacted ethylene content in a range of 30 to 80 wt %. The difference in ethylene content between the first and the second copolymer is at least 5 wt %, and the ratio of weight averaged molecular weight (Mw) of the second copolymer to the Mw of the first copolymer is 1.5 or greater.

DETAILED DESCRIPTION

Definitions

Figure 1:
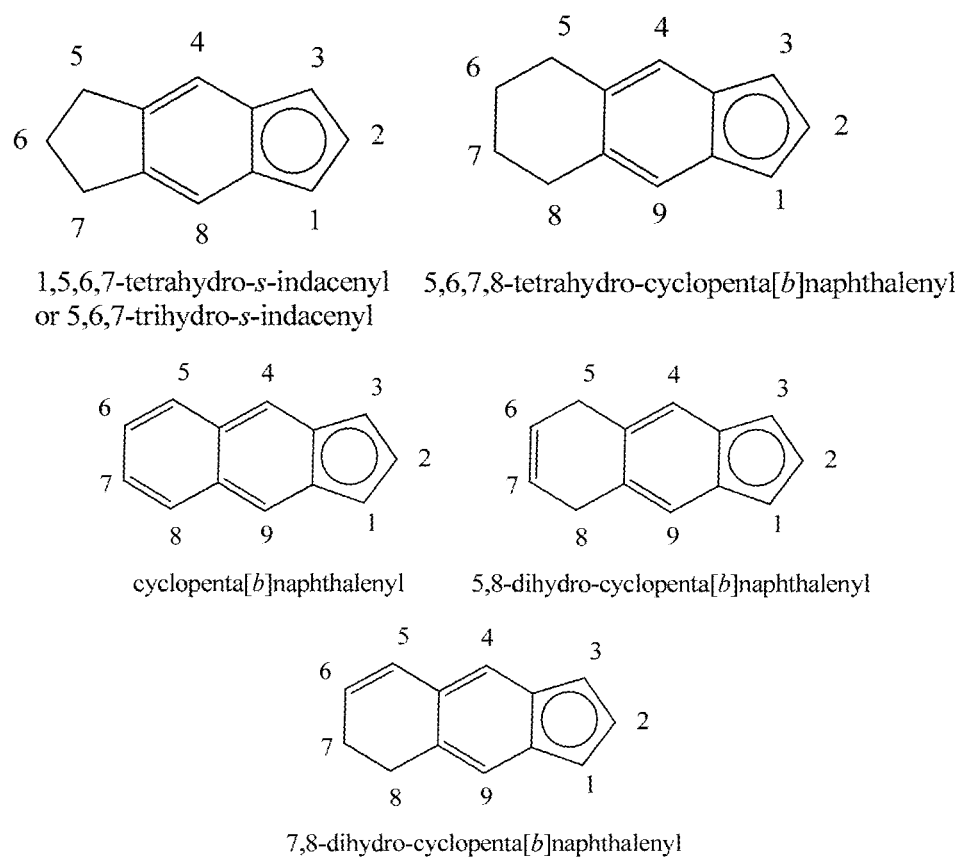
FIG. 1 illustrates examples of indacenyl and cyclopenta[b]naphthalenyl compounds.

As used herein, the numbering scheme for the Periodic Table Groups is the notation as set out in CHEMICAL AND ENGINEERING NEWS, 63(5), 27 (1985). Therefore, a "group 4 metal" is an element from group 4 of the Periodic Table, e.g. Zr, Ti, and Hf.

The terms "hydrocarbyl radical," "hydrocarbyl" and "hydrocarbyl group" are used interchangeably throughout this document. Likewise the terms "group", "radical", and "substituent" (when referring to subsets of chemical compounds) are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one H atom has been substituted with at least one functional group, e.g., NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like, or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$—, etc. R* is independently a hydrocarbyl or halocarbyl radical, and two or more R* may join together to form a substituted or unsubstituted saturated, partially unsaturated or aromatic cyclic or polycyclic ring structure. Further, substituted hydrocarbyl radicals include silylcarbyl radicals, germylcarbyl radicals, and halocarbyl radicals. Silylcarbyl radicals (also called silylcarbyls) are groups in which a silyl functionality is bonded directly to the indicated atom or atoms (e.g., —SiR*$_2$, Si(OR*)$_2$, Si(NR*$_2$)$_2$, etc., where R* is as just defined regarding hydrocarbyl radicals). Likewise, germylcarbyl radicals (also called germylcarbyls) are groups in which the germyl functionality is bonded directly to the indicated atom or atoms (e.g., GeR*$_2$, Ge(OR*)$_2$, Ge(NR*$_2$)$_2$, etc.).

Halocarbyl radicals are radicals in which one or more hydrocarbyl hydrogen atoms have been substituted with at least one halogen (e.g. F, Cl, Br, I) or halogen-containing group (e.g. CF$_3$). In "substituted halocarbyl radicals," at least one halocarbyl H or halogen atom has been substituted with at least one functional group, as described above for substituted hydrocarbyl radicals.

Thus, examples of hydrocarbyl radicals include, e.g., methyl, ethyl, ethenyl and isomers of propyl, butyl, pentyl, and so forth. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, cyclopentyl, cyclopentenyl, cyclohexyl, and the like. For this disclosure, when a radical is listed, it indicates that radical type and all other radicals formed when that radical type is subjected to the substitutions defined above. Alkyl, alkenyl and alkynyl radicals include all isomers including cyclic isomers. For example, butyl includes n-butyl, 2-methylpropyl, 1-methylpropyl, tert-butyl, and cyclobutyl (and analogous substituted cyclopropyls). Cyclic compounds having substitutions include all isomer forms, for example, methylphenyl would include ortho-methylphenyl, meta-methylphenyl and para-methylphenyl.

"Ring Structure" means atoms bonded together in one or more cyclic arrangements.

An "olefin," alternatively referred to as "alkene," is a linear, branched, or cyclic compound of carbon and hydrogen having at least one double bond. When a polymer or copolymer is referred to as comprising an olefin, the olefin present in such polymer or copolymer is the polymerized form of the olefin. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically.

Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

"Homopolymerization" would produce a polymer made from one type of monomer, whereas "copolymerization" would produce polymers with more than one monomer type.

A high molecular weight polymer ("HMP") as used herein references a polymer, typically a copolymer, having Mw of 50,000 g/mol or greater and produced by an HMP catalyst system, which is defined below, and various embodiments of which are described in detail herein.

The designation "HMP-VTP" may be used to denote a sub-set of HMPs that incorporate one or more units derived from a vinyl-terminated polymer (VTP) as described herein.

A vinyl-terminated polymer, sometimes referred to as a vinyl-terminated macromonomer, ("VTP") is a polymer, which may be suitable for use as macromonomer, having a specified percentage (e.g., greater than 60%) of vinyl chain ends, relative to total polymer chain-end unsaturations. A "vinyl chain end" or "vinyl termination" is a vinyl group located at a terminus of a polymer, and can be located on any one or more termini of the polymer. A vinyl chain end may be either an "allyl chain end" or a "3-alkyl chain end." Reference to a vinyl-terminated "macromonomer" is not intended, alone, to limit the size (e.g., Mw or Mn) of the VTP, nor the necessary use of the VTP, but merely is a reference of convenience, given the potential treatment of the VTP as a "monomer" to be incorporated into another polymer.

An "allyl chain end," also referred to as an "allylic vinyl group" or "allylic vinyl termination," is shown in the formula:

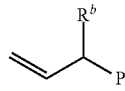

where P represents the polyolefin chain and R$^b$ is hydrogen. A 3-alkyl chain end, also referred to as a "3-alkyl vinyl end group" or a "3-alkyl vinyl termination", is represented by the same formula where P represents the polyolefin chain and where R$^b$ is instead an alkyl group, such as a C$_1$ to C$_{50}$ alkyl group. R$^b$ may be substantially larger, e.g., C$_{1-100}$ or greater, provided that R$^b$ is a shorter alkyl chain than the polyolefin chain.

A polymerization catalyst system is a catalyst system that can polymerize monomers to polymer. The term "catalyst system" is defined to mean a catalyst precursor/activator pair, and optional co-activator, and an optional support material. When "catalyst system" is used to describe such a precursor/activator pair before activation, it means the unactivated catalyst (precatalyst, or catalyst precursor) together with an activator and, optionally, a co-activator. When it is used to describe such a pair after activation, it means the activated catalyst and the activator or other charge-balancing moiety. When catalyst systems are described as comprising neutral stable forms of the components, it is well understood by one of ordinary skill in the art, that the ionic form of the component is the form that reacts with the monomers to produce polymers. Catalyst precursors may also be referred to interchangeably as precatalyst, catalyst, catalyst compound, catalyst precursor, transition metal compound or transition metal complex. A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. A transition metal compound may be neutral as in a precatalyst, or a charged species with a counter ion as in an activated catalyst system.

An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl (Cp) moiety (or substituted cyclopentadienyl moiety such as indenyl or fluorenyl) and more frequently two π-bound cyclopentadienyl moieties or substituted cyclopentadienyl moieties. This includes other π-bound moieties such as indenyls or fluorenyls or derivatives thereof. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl ring structures which may be fused to additional saturated, partially unsaturated, or aromatic hydrocarbyl rings.

For nomenclature purposes, the following numbering schemes are used for indenyl. It should be noted that indenyl can be considered a cyclopentadienyl with a fused benzene ring. The structure below is drawn and named as an anion.

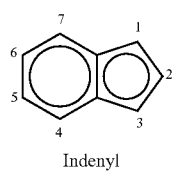

Indenyl

The ring structures shown in FIG. 1 are indacenyls and cyclopenta[b]naphthalenyls, which are substituted indenyl anions where the substitution at the 5 and 6 positions of the indenyl forms a ring structure. FIG. 1 also indicates carbon numbering on these substituted indenyls, and sets forth the name of each example indenyl compound shown therein.

Similarly, the following numbering scheme is used for fluorenyl, also drawn below and named as an anion.

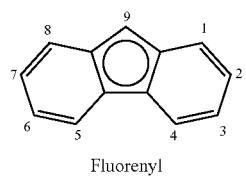

Fluorenyl

Figure 2:
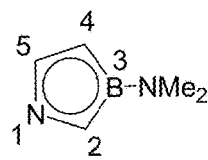
FIG. 2 illustrates examples of heterocyclopentadienyl compounds.
Figure 2:
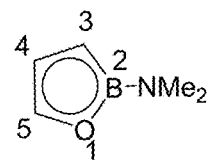
Figure 2:
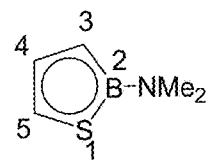
Figure 2:
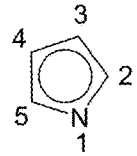
Figure 2:
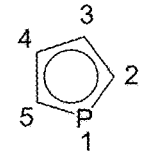
Figure 2:
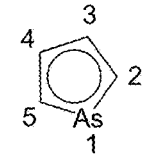
Figure 2:
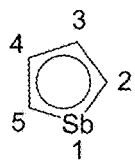
Figure 2:
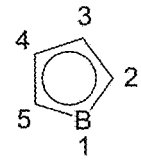
Figure 3:
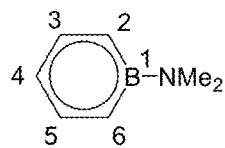
FIG. 3 illustrates examples of heterophenyl compounds.
Figure 3:
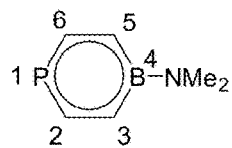
Figure 3:
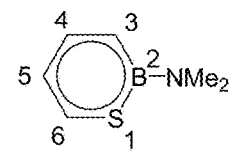
Figure 4:
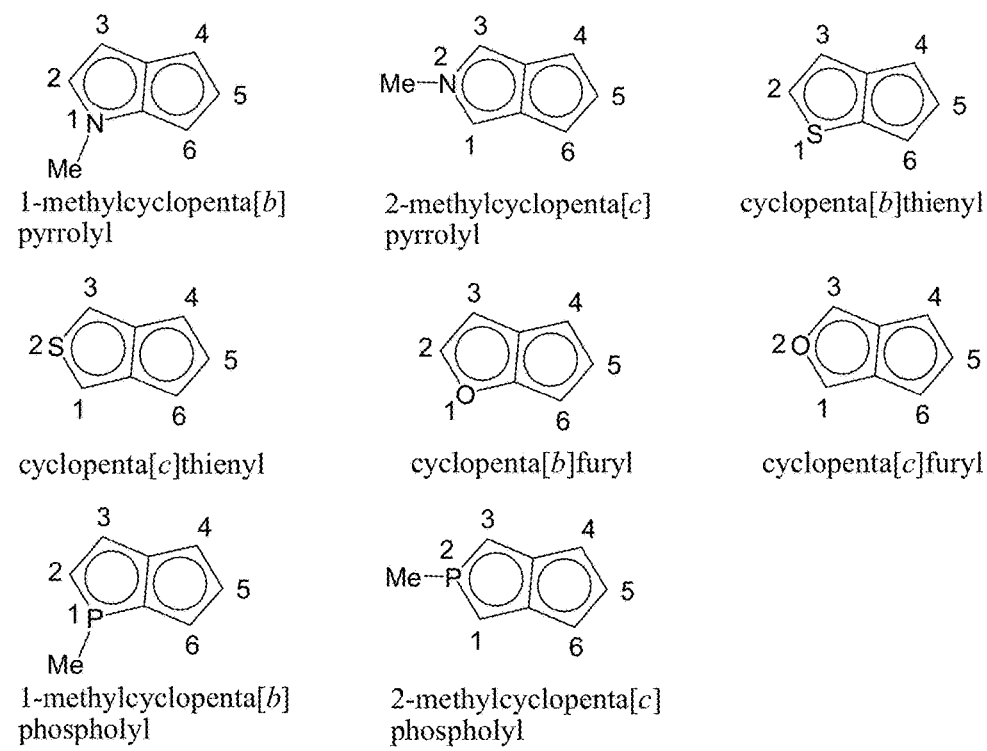
FIG. 4 illustrates examples of heterpentalenyl compounds.
Figure 5:
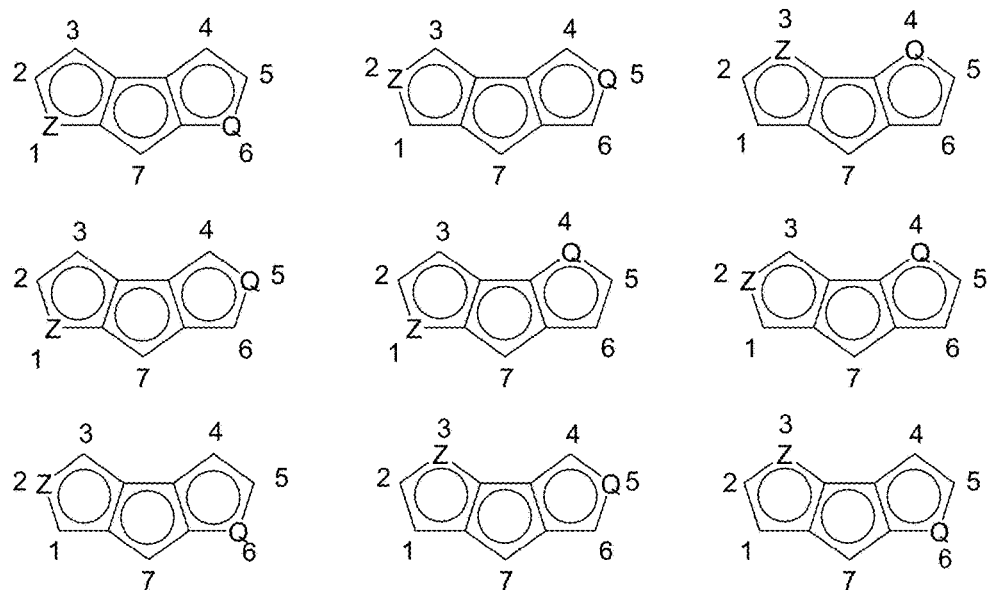
FIG. 5 illustrates examples of heterocylopentapentalenyl compounds.
Figure 6:
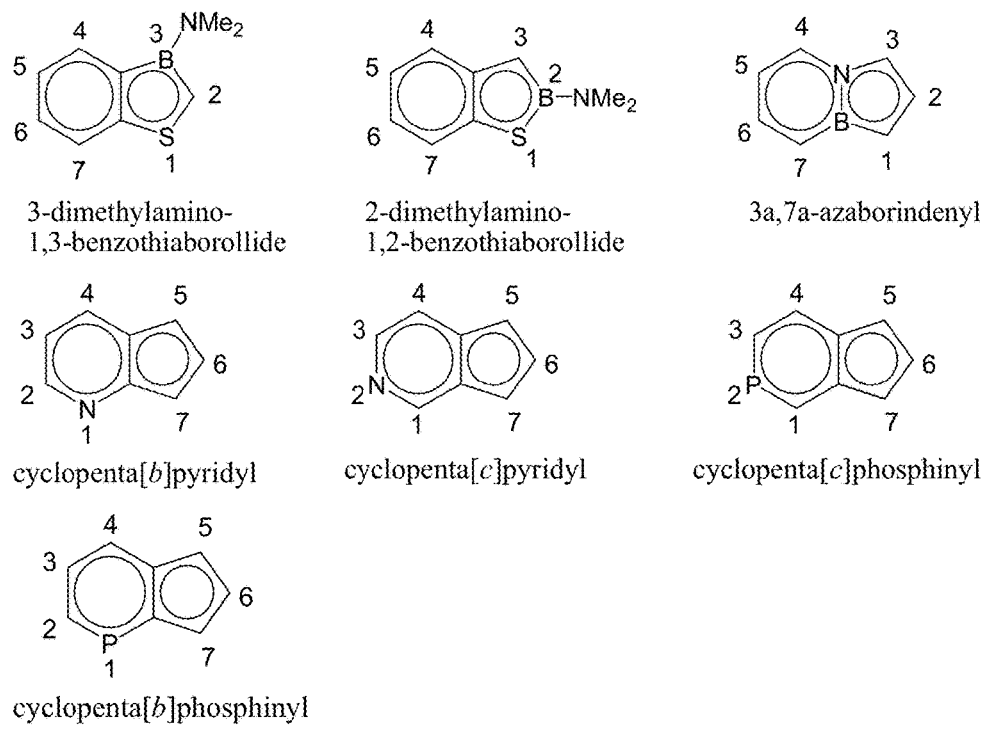
FIG. 6 illustrates examples of heteroindenyl compounds.
Figure 7:
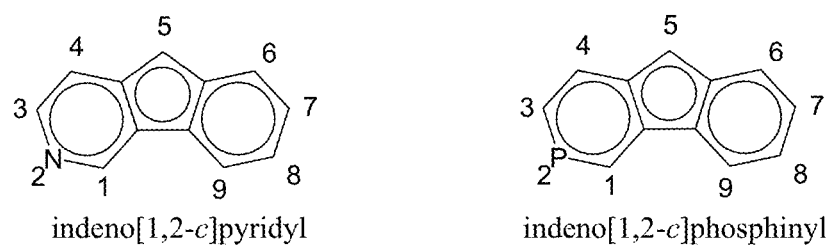
FIG. 7 illustrates examples of heterofluorenyl compounds.
Figure 8:
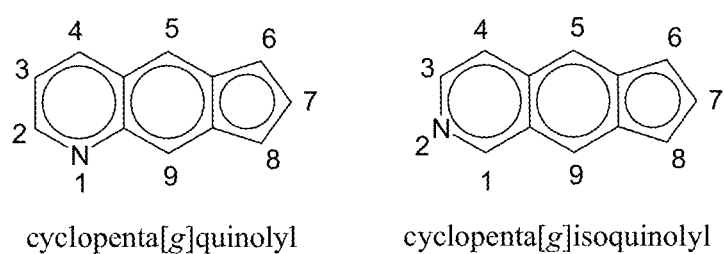
FIG. 8 illustrates examples of heterocyclopentanaphthyl compounds.
Figure 9:
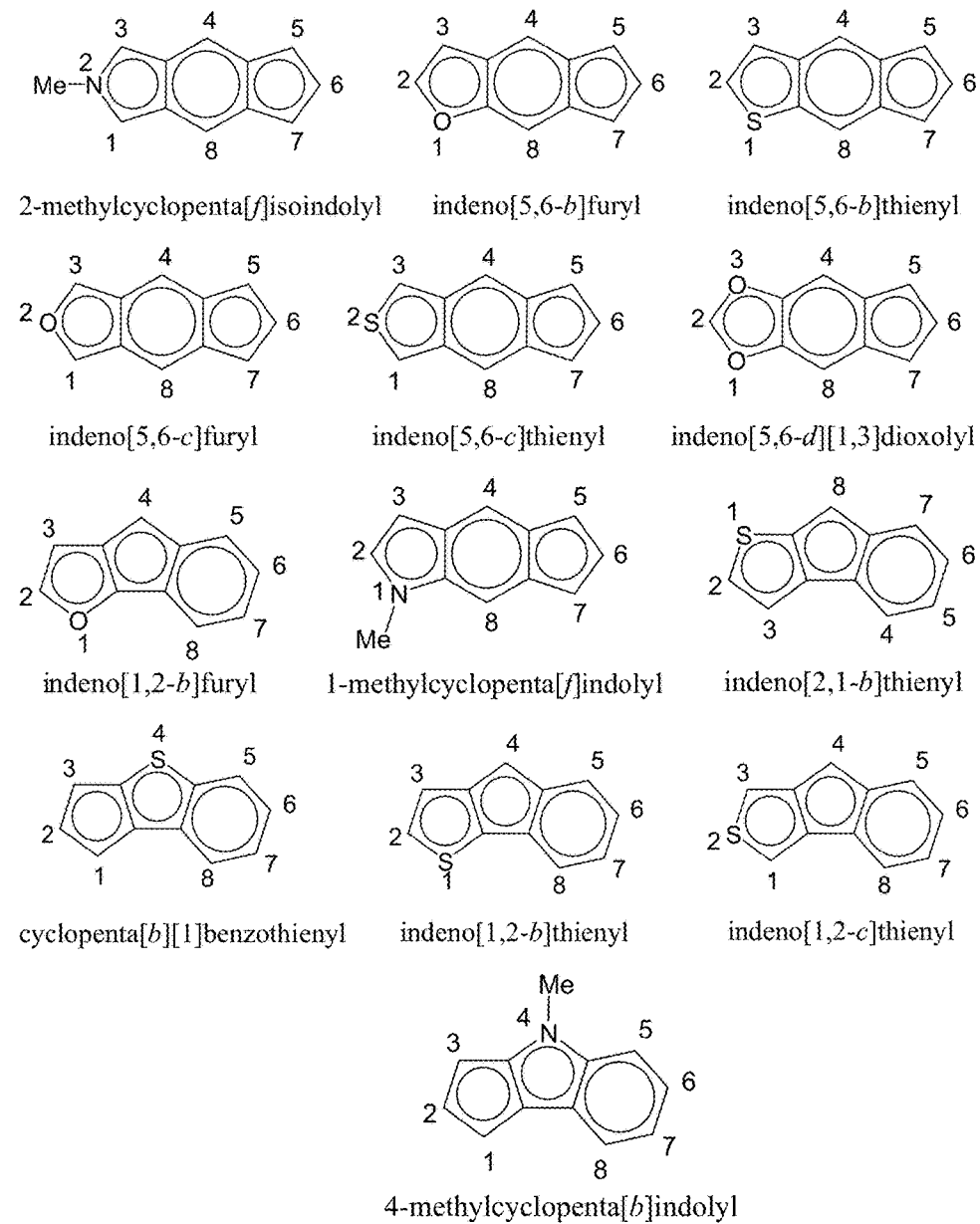
FIG. 9 illustrates examples of heterocyclopentaindenyl compounds.
Figure 10:
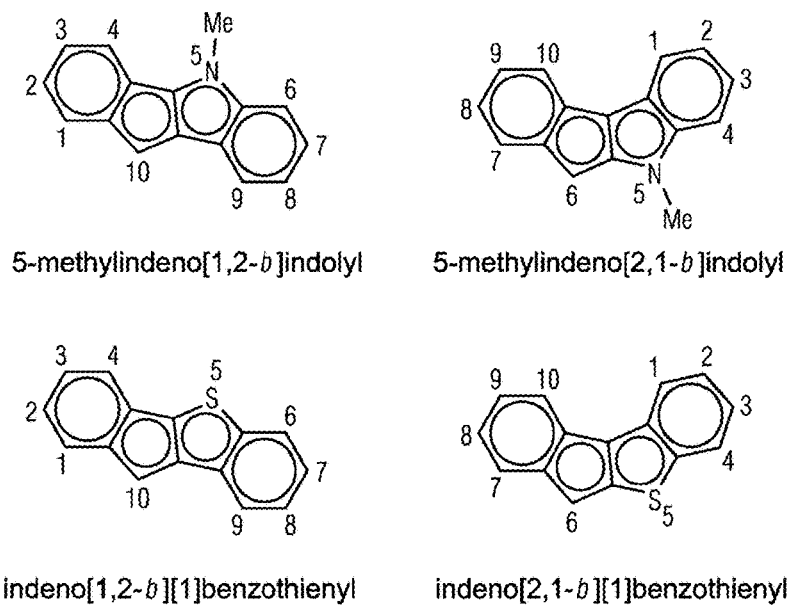
FIG. 10 illustrates examples of heterobenzocyclopentaindenyl compounds.

Similar numbering and nomenclature schemes are used for heterocyclopentadienyls, heterophenyls, heteropentalenyls, heterocyclopentapentalenyls, heteroindenyls, heterofluorenyls, heterocyclopentanaphthyls, heterocyclopentaindenyls, heterobenzocyclopentaindenyls, and the like, as illustrated in FIGS. 2-10, in which each structure is drawn and named as an anion, with carbon (or substitution) numbering illustrated for each example structure. In particular, FIG. 2 depicts examples of heterocyclopentadienyls; FIG. 3 illustrates examples of heterophenyls; FIG. 4 illustrates examples of heteropentalenyls; FIG. 5 illustrates examples of heterocylopentapentalenyls (where Z and Q in FIG. 5 independently represent the heteroatoms O, S, Se, or Te, or heteroatom groups, NR, PR, AsR, or SbR where R** is hydrogen, or a hydrocarbyl, substituted hydrocarbyl, halocarbyl, substituted halocarbyl, silylcarbyl, or germylcarbyl substituent); FIG. 6 illustrates examples of heteroindenyls; FIG. 7 illustrates examples of heterofluorenyls; FIG. 8 illustrates examples of heterocyclopentanaphthyls; FIG. 9 illustrates examples of heterocyclopentaindenyls; and FIG. 10 illustrates examples of heterobenzocyclopentaindenyls. Further, any of the aforementioned structures may be substituted (i.e., contain a different group in place of one or more H atoms in the structure), for instance the aforementioned structures may be substituted with one or more hydrocarbyl radicals, substituted hydrocarbyl radicals, and/or halocarbyl radicals.

As used herein, a HMP catalyst or HMP catalyst system is a catalyst compound, or catalyst system including a catalyst compound, that is capable of producing high molecular weight (Mw greater than 50,000 g/mol) copolymers (HMPs), as described in various embodiments herein. Embodiments of HMP catalysts are described in greater detail hereinbelow. The term "HMP catalyst" is not, alone, intended to limit such catalysts; rather, the label is provided as a convenient means to distinguish HMP catalysts and catalyst systems described herein from other catalysts and catalyst systems, such as the VTP catalysts or catalyst systems.

As used herein, a VTP catalyst or VTP catalyst system is a catalyst compound, or catalyst system including a catalyst compound, that is capable of producing VTPs, as described in various embodiments herein, and is preferably capable of producing polymer having greater than 60% of vinyl chain ends, relative to total polymer chain-end unsaturations (preferably greater than 70%, preferably greater than 80%, preferably greater than 85%, preferably greater than 90%, preferably greater than 95%, preferably greater than 98%). As with the HMP catalyst, the term "VTP catalyst" is not, alone, intended to limit these catalysts. Rather, the label is provided as a convenient means to distinguish VTP catalysts and catalyst systems described herein from other catalysts and catalyst systems, such as the HMP catalysts or catalyst systems.

Noncoordinating anion (NCA) is defined to mean an anion either that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals and metalloids include, but are not limited to, aluminum, gold, platinum, boron, phosphorus, and silicon, particularly aluminum. Further, "compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion.

A stoichiometric activator can be either neutral or ionic. The terms ionic activator, and stoichiometric ionic activator can be used interchangeably. Likewise, the terms neutral stoichiometric activator, and Lewis acid activator can be used interchangeably.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn (Mw/Mn). Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane. An "alkyl" group is a linear, branched, or cyclic radical of carbon and hydrogen. In a preferred embodiment, "alkyl" refers to linear alkyls.

"Continuous" means a system that operates for at least a period of time without interruption or cessation. For example, a continuous polymerization process would be one where reactants are continually introduced into one or more reactors, and product continually withdrawn.

Description of Polymerization Processes and Components

As previously noted, some aspects of the polymerization processes described herein employ either an HMP catalyst system, or both an HMP catalyst system and a VTP catalyst system. Each catalyst system in general comprises its respective catalyst compound and one or more activators (which may be the same or different). The polymerization processes varyingly include contacting a plurality of monomers with both the HMP catalyst system and a VTP catalyst system, or contacting a suitable VTP, along with one or more additional monomers, with the HMP catalyst system. The VTP may in some embodiments be produced by a VTP catalyst system. The HMP catalyst system produces HMPs, which in some aspects may further incorporate a VTP into the HMP structure to form long chain branched architecture.

VTP Catalysts

VTP catalyst systems are capable of forming VTPs, that is, polymers and copolymers having more than 60% vinyl chain ends relative to total polymer chain-end unsaturations. In general, VTP catalyst systems include a VTP catalyst compound and an activator. VTP catalyst systems may further optionally include a support and/or one or more co-activators. Various activators, co-activators, and supports may be the same or different for both the VTP and HMP catalysts. Such components of catalyst systems are described with respect to both catalysts below.

Particularly useful VTP catalyst compounds include metallocene catalysts, such as bridged group 4 transition metal (e.g., hafnium or zirconium, preferably hafnium) metallocene catalyst compounds having two indenyl ligands. The indenyl ligands in some embodiments have various substitutions. In particular embodiments, the metallocene catalyst compounds, and catalyst systems comprising such compounds, are represented by the formula (1):

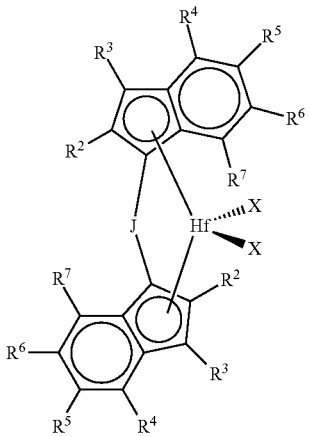

where: (1) J is a divalent bridging group comprising C, Si, or both; (2) M is a group 4 transition metal (preferably Hf); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$, $R^3$, $R^4$, $R^5$, $R^6$, and $R^7$ is independently hydrogen, $C_1$-$C_{50}$ substituted or unsubstituted hydrocarbyl (such as $C_1$-$C_{50}$ substituted or unsubstituted halocarbyl), provided that any one or more of the pairs $R^4$ and $R^5$, $R^5$ and $R^6$, and $R^6$ and $R^7$ may optionally be bonded together to form a saturated or partially saturated cyclic or fused ring structure. Such compounds are also referred to as bis-indenyl metallocene compounds.

In certain embodiments, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

In some particular embodiments, each $R^2$, $R^3$, $R^4$, $R^5$, $R^6$, and $R^7$ are independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$ $CH_2Si(CH_3)_3$; $CH_2Ph$; $C_3H_5$, $C_4H_7$; $C_5H_9$; $C_6H_{11}$; $C_7H_{13}$; $C_8H_{15}$; $C_9H_{17}$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$. In some particular embodiments, each $R^2$, $R^3$, $R^4$, $R^5$, $R^6$, and $R^7$ are independently selected from hydrogen, or $C_1$-$C_{10}$ alkyl (preferably hydrogen, methyl, ethyl, propyl, butyl, pentyl, heptyl, hexyl, octyl, nonyl, decyl or an isomer thereof).

In yet other embodiments, each $R^3$ is H; each $R^4$ is independently $C_1$-$C_{10}$ alkyl (preferably methyl, ethyl, propyl, butyl, pentyl, heptyl, hexyl, octyl, nonyl, decyl or an isomer thereof); each $R^2$, and $R^7$ are independently hydrogen, or $C_1$-$C_{10}$ alkyl); each $R^5$ and $R^6$ are independently hydrogen, or $C_1$-$C_{50}$ substituted or unsubstituted hydrocarbyl (preferably hydrogen or $C_1$-$C_{10}$ alkyl); and $R^4$ and $R^5$, $R^5$ and $R^6$ and/or $R^6$ and $R^7$ may optionally be bonded together to form a ring structure. In more specific embodiments, each $R^2$ is independently a $C_1$ to $C_3$ alkyl group, preferably methyl, ethyl, n-propyl, isopropyl or cyclopropyl, each $R^3$, $R^5$, $R^6$, and $R^7$ are hydrogen, and each $R^4$ is independently a $C_1$ to $C_4$ alkyl group, preferably methyl, ethyl, n-propyl, cyclopropyl, or n-butyl.

In yet other specific embodiments, each $R^2$ is a $C_1$ to $C_3$ alkyl group, preferably methyl, ethyl, n-propyl, isopropyl or cyclopropyl, each $R^3$, $R^5$, and $R^6$ are hydrogen, and $R^4$ and $R^7$ are, independently, a $C_1$ to $C_4$ alkyl group, preferably methyl, ethyl, propyl, butyl, or an isomer thereof.

In yet further specific embodiments, each $R^2$, $R^4$, and $R^7$ are independently methyl, ethyl, or n-propyl, each $R^5$ and $R^6$ are independently, a $C_1$ to $C_{10}$ alkyl group, preferably methyl, ethyl, propyl, butyl, pentyl, heptyl, hexyl, octyl, nonyl, decyl or an isomer thereof, $R^3$ is hydrogen, and $R^5$ and $R^6$ are joined together to form a 5-membered partially unsaturated ring.

In one embodiment, each $R^2$, $R^4$ and $R^7$ are the same, selected from the group consisting of $C_1$ to $C_3$ alkyl group (any isomer thereof), and $R^3$, $R^5$ and $R^6$ are hydrogen. In yet other embodiments, each $R^4$ and $R^7$ are the same, selected from the group consisting of $C_1$-$C_3$ alkyl (any isomer thereof), and $R^2$, $R^3$, $R^5$, and $R^6$ are hydrogen or alternatively $R^2$ and $R^3$ are hydrogen, while $R^5$ and $R^6$ are joined together to form a 5-membered partially unsaturated ring.

In certain embodiments of the VTP catalyst compound, $R^4$ is not an aryl group (substituted or unsubstituted). An aryl group is defined to be a single or multiple fused ring group where at least one ring is aromatic. A substituted aryl group is an aryl group where a hydrogen has been replaced by a heteroatom or heteroatom containing group. Examples of substituted and unsubstituted aryl groups include phenyl, benzyl, tolyl, carbazolyl, naphthyl, and the like. Likewise, in particular embodiments, $R^2$, $R^4$ and $R^7$ are not a substituted or unsubstituted aryl group. In even further embodiments, $R^2$, $R^4$, $R^5$, $R^6$ and $R^7$ are not a substituted or unsubstituted aryl group.

J may be represented by the formula (1a):

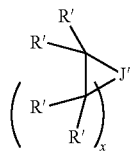

wherein J' is C or Si (preferably Si), x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In a particular embodiment of the invention, J may be represented by the formula $(R^a{}_2J')_n$ where each J' is independently C or Si (again, with J' preferably Si), n is 1 or 2, and each $R^a$ is, independently, $C_1$ to $C_{20}$ substituted or unsubstituted hydrocarbyl, provided that two or more $R^a$ optionally may be joined together to form a saturated or partially saturated or aromatic cyclic or fused ring structure that incorporates at least one J'. Particular examples of J groups include dimethylsilylene, diethylsilylene, isopropylene, ethylene and the like.

In a particular embodiment, the bis-indenyl metallocene compound used herein is at least 90% rac isomer and the indenyl groups are substituted at the 4 position with a $C_1$ to $C_{10}$ alkyl group, the 3 position is hydrogen, the bridge is carbon or silicon which is incorporated into a 4, 5 or 6 membered ring. For instance, the VTP catalyst compound may either the rac or meso form of cyclotetramethylenesilylene-bis(2,4,7-trimethylinden-1-yl)hafnium dimethyl, shown below:

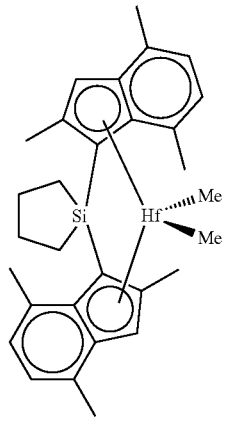

As noted, the catalyst compounds can be in rac or meso form. In one particular embodiment, the catalyst compound is in the rac form. For instance, at least 90 wt % of the catalyst compound may be in the rac form, based upon the weight of the rac and meso forms present. More particularly, at least any one of about 92, 93, 94, 95, 96, 97, 98, and 99 wt % of the catalyst compound may be in rac form. In one embodiment, all of the catalyst compound is in rac form.

VTP catalyst compounds that are particularly useful in this invention include one or more of the metallocene compounds listed and described in Paragraphs [0089]-[0090] of U.S. Ser. No. 14/325,449, filed Jul. 8, 2014, published Jan. 22, 2015 as US 2015/0025209, which is incorporated by reference herein. For instance, useful VTP catalyst compounds may include any one or more of: cyclotetramethylenesilylene-bis(2,4,7-trimethylinden-1-yl) hafnium dimethyl; cyclopentamethylene-silylene-bis(2,4,7-trimethylinden-1-yl)hafnium dimethyl; cyclotrimethylenesilylene-bis(2,4,7-trimethylinden-1-yl)hafnium dimethyl; cyclotetramethylenesilylene-bis(2,4-dimethylinden-1-yl) hafnium dimethyl; cyclopentamethylenesilylene-bis(2,4-dimethylinden-1-yl)hafnium dimethyl, cyclotrimethylenesilylene-bis(2,4-dimethylinden-1-yl)hafnium dimethyl; cyclotetramethylene-silylene-bis(4,7-dimethylinden-1-yl) hafnium dimethyl; cyclopentamethylenesilylene-bis(4,7-dimethylinden-1-yl)hafnium dimethyl; cyclotrimethylenesilylene-bis(4,7-dimethylinden-1-yl)hafnium dimethyl; cyclotetramethylenesilylene-bis(2-methyl-4-cyclopropylinden-1-yl)hafnium dimethyl; cyclopentamethylenesilylene-bis(2-methyl-4-cyclopropylinden-1-yl)hafnium dimethyl, cyclotrimethylenesilylene-bis(2-methyl-4-cyclopropylinden-1-yl)hafnium dimethyl; cyclotetra-methylenesilylene-bis(2-ethyl-4-cyclopropylinden-1-yl)hafnium dimethyl; cyclopentamethylene-silylene-bis(2-ethyl-4-cyclopropylinden-1-yl)hafnium dimethyl; cyclotrimethylenesilylene-bis (2-ethyl-4-cyclopropylinden-1-yl)hafnium dimethyl; cyclotetramethylenesilylene-bis(2-methyl-4-t-butylinden-1-yl) hafnium dimethyl; cyclopentamethylenesilylene-bis(2-methyl-4-t-butylinden-1-yl)hafnium dimethyl; cyclotrimethylenesilylene-bis(2-methyl-4-t-butylinden-1-yl)hafnium dimethyl, cyclotetramethylenesilylene-bis(4,7- diethylinden-1-yl)hafnium dimethyl; cyclopentamethylene-silylene-bis(4,7-diethylinden-1-yl)hafnium dimethyl; cyclotrimethylenesilylene-bis(4,7-diethylinden-1-yl)hafnium dimethyl; cyclotetramethylenesilylene-bis(2,4-diethylinden-1-yl)hafnium dimethyl; cyclopentamethylenesilylene-bis(2,4-diethylinden-1-yl)hafnium dimethyl; cyclotrimethylenesilylene-bis(2,4-diethylinden-1-yl)hafnium dimethyl; cyclotetramethylenesilylene-bis(2-methyl-4,7-diethylinden-1-yl)hafnium dimethyl; cyclopentamethylenesilylene-bis(2-methyl-4,7-diethylinden-1-yl)hafnium dimethyl; cyclotrimethylenesilylene-bis(2-methyl-4,7-diethylinden-1-yl)hafnium dimethyl; cyclotetramethylenesilylene-bis(2-ethyl-4-methylinden-1-yl)hafnium dimethyl; cyclopentamethylenesilylene-bis(2-ethyl-4-methylinden-1-yl)hafnium dimethyl; cyclotrimethylene-silylene-bis(2-ethyl-4-methylinden-1-yl)hafnium dimethyl; cyclotetramethylenesilylene-bis(2-methyl-4-isopropylinden-1-yl)hafnium dimethyl; cyclopentamethylenesilylene-bis(2-methyl-4-isopropylinden-1-yl)hafnium dimethyl; cyclotrimethylenesilylene-bis(2-methyl-4-isopropylinden-1-yl)hafnium dimethyl; cyclotetramethylenesilylene-bis(2,4,8-trimethyl-1,5,6,7-tetrahydro-s-indacen-1-yl)hafnium dimethyl; cyclopentamethylenesilylene-bis(2,4,8-trimethyl-1,5,6,7-tetrahydro-s-indacen-1-yl)hafnium dimethyl; cyclotrimethylenesilylene-bis(2,4,8-trimethyl-1,5,6,7-tetrahydro-s-indacen-1-yl)hafnium dimethyl; cyclotetramethylenesilylene-bis(4,8-dimethyl-1,5,6,7-tetrahydro-s-indacen-1-yl)hafnium dimethyl; cyclopentamethylenesilylene-bis(4,8-dimethyl-1,5,6,7-tetrahydro-s-indacen-1-yl)hafnium dimethyl; and cyclotrimethylenesilylene-bis(4,8-dimethyl-1,5,6,7-tetrahydro-s-indacen-1-yl)hafnium dimethyl.

Likewise, the VTP catalyst compounds described herein may be synthesized in any suitable manner, including in accordance with procedures described in Paragraphs [0096] and [00247]-[00298] of U.S. Ser. No. 14/325,449, filed Jul. 8, 2014, and published Jan. 22, 2015 as US 2015/0025209, and which is incorporated by reference herein.

HMP Catalysts

The HMP catalyst system is capable of making high Mw (Mw greater than 50,000 g/mol) polymers (HMPs). HMP catalyst systems according to some embodiments may further be capable of incorporating vinyl-terminated polymer chains (such as VTPs, discussed in greater detail below) into the HMPs formed thereby. When a VTP is incorporated into the HMP, such polymer may be referred to as a HMP-VTP. Thus, in some embodiments, the HMP catalyst produces a copolymer by incorporating a plurality of monomers (including one or more VTPs and one or more additional monomers) into a copolymer, the copolymer having high Mw.

In some embodiments, the HMP catalyst system includes a catalyst compound and an activator, as well as an optional support and/or optional co-activators, in particular embodiments. The HMP catalyst compound may be a metallocene capable of incorporating vinyl-terminated polymer chains into a polymer, and further capable of producing high Mw copolymer.

Suitable catalyst compounds meeting these criteria include, for example, mono-Cp amido group 4 complexes (and/or mono-Cp amido variants as described below), bridged fluorenyl-cyclopentadienyl group 4 complexes (and/or Cp-fluorenyl variants, as described below), biphenyl phenol (BPP) transition metal complexes, pyridyl amide transition metal complexes and/or pyridyl diamide transition metal complexes.

In some embodiments, the mono-Cp amido group 4 complexes include compounds of the following general structural formula (2a):

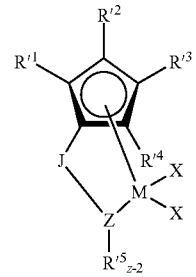

where: (1) J is a divalent bridging group (preferably comprising C, Si, or both); (2) M is a group 4 transition metal (preferably Ti in some embodiments); (3) each X is independently a univalent anionic ligand, or two Xs are joined and bound to the metal atom to form a metallocycle ring, or two Xs are joined to form a chelating ligand, a diene ligand, or an alkylidene ligand; (4) each $R'^1$, $R'^2$, $R'^3$, $R'^4$, and $R'^5$ is independently hydrogen, $C_1$-$C_{50}$ hydrocarbyl, substituted hydrocarbyl, halocarbyl, or substituted halocarbyl provided that any one or more of the pairs $R'^1$ and $R'^2$, $R'^2$ and $R'^3$, and $R'^3$ and $R'^4$, may optionally be bonded together to form a saturated or partially saturated cyclic or fused ring structure; and (5) Z is a group 15 or 16 element with a coordination number of three if from group 15 or with a coordination number of two if from group 16 of the Periodic Table of Elements, and z is the coordination number of the element Z. Preferably Z is N.

In certain embodiments, J is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ containing hydrocarbyl, substituted hydrocarbyl, halocarbyl, or substituted halocarbyl and optionally two or more adjacent $R^*$ may join to form a substituted or unsubstituted, saturated, partially unsaturated or aromatic, cyclic or polycyclic substituent. In another embodiment, J is a bridging group comprising carbon and/or silicon atoms, such as dialkylsilyl, preferably J is selected from $CH_2$, $CH_2CH_2$, $C(CH_3)_2$, $SiMe_2$, $SiEt_2$, $SiPh_2$, $SiMePh$, $Ph_2C$, $(p-(Et)_3SiPh)_2C$, $Si(CH_2)_3$, $Si(CH_2)_4$ and $Si(CH_2)_5$. Alternatively, J may be any of the groups described for "J" in the VTP catalysts above.

In certain embodiments, each X is selected in accordance with X as set forth in the previously-described VTP catalyst compounds (i.e., as described for formula (1) above).

In some embodiments, each $R'^1$, $R'^2$, $R'^3$, $R'^4$, and $R'^5$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_{12}H_{23}$, $C_{10}H_{15}$, $C_6H_5$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$.

In particular embodiments, each of $R'^1$, $R'^2$, $R'^3$, and $R'^4$ is independently $C_1$-$C_{10}$ alkyl or hydrogen. For instance, each of $R'^1$, $R'^2$, $R'^3$, and $R'^4$ may be methyl or hydrogen. In specific embodiments, each of $R'^1$, $R'^2$, $R'^3$, and $R'^4$ is methyl (as is the case in an HMP catalyst compound according to some embodiments, dimethylsilylene (tetramethylcyclopentadienyl) (cyclododecylamido) titanium dimethyl). Alternatively, in other embodiments, one of $R^{t1}$, $R^{t2}$, $R^{t3}$, and $R^{t4}$ is hydrogen, the remaining $R^{t1}$, $R^{t2}$, $R^{t3}$, and $R^{t4}$ are each methyl, (as is the case in, e.g., dimethylsilylene(trimethyl-cyclopentadienyl)(adamantylamido) titanium dimethyl, a HMP catalyst compound according to other embodiments). In yet further embodiments, any of the pairs $R^{t1}$ and $R^{t2}$, $R^{t2}$ and $R^{t3}$, $R^{t3}$ and $R^{t4}$ may be bonded together so as to form, together with the cyclopentadienyl moiety to which those pairs are attached, an indenyl, tetrahydro-s-indacenyl, or tetrahydro-as-indacenyl group (as is the case, for instance, with dimethylsilylene(2-methyl-1,5,6,7-tetrahydro-s-indacen-1-yl)(tert-butylamido)titanium dimethyl, a HMP catalyst compound according to further embodiments). Another particular example of a suitable mono-Cp amido group 4 HMP catalyst compound according to some embodiments is dimethylsilylene(2,6,6-trimethyl-1,5,6,7-tetrahydro-s-indacen-1-yl)(tert-butylamido) titanium dimethyl.

$R^{t5}$ may be selected from $C_1$-$C_{30}$ hydrocarbyl, substituted hydrocarbyl, halocarbyl, or substituted halocarbyl groups. In further example embodiments, $R^{t5}$ is a $C_1$ to $C_{12}$ hydrocarbyl group such as methyl, ethyl, propyl (n- or iso-), butyl (n-, iso-, sec-, or tert-), etc. (e.g., ten-butyl). Alternatively, $R^{t5}$ may be a cyclic group, e.g., adamantyl, cyclopropyl, cyclobutyl, cyclopentyl, cyclohexyl, cycloheptyl, cylcooctyl, cyclononyl, cyclodecyl, cylcododecyl, or norbornyl. Alternatively, $R^{t5}$ in certain embodiments may be an aromatic group, e.g., phenyl, tolyl, naphthyl, anthracenyl. etc. In some embodiments, $R^{t5}$ is t-butyl or cyclododecyl, and preferably Z is N. Particular examples of some suitable mono-Cp amido group 4 HMP catalyst compounds thus include: dimethylsilylene(tetramethylcyclopentadienyl) (cyclododecylamido)titanium dimethyl; dimethylsilylene(tetramethylcyclopentadienyl)(tert-butylamido)titanium dimethyl; and dimethylsilylene(tetramethylcyclopentadienyl)(adamantylamido)titanium dimethyl.

Furthermore, in certain other embodiments, the use of HMP catalysts that are variants of mono-Cp amido compounds is contemplated (such catalyst compounds referred to as "mono-Cp amido variants"). In such embodiments, Z may be O, S, or P instead of N (with the proviso that, when Z is a group 16 element, z is 2 and $R^{t5}$ is absent). Also or instead, the Cp moiety of general formula 2(a) (i.e., the Cp ring to which $R^{t1}$-$R^{t4}$ are appended) may be replaced by another suitable monocyclic or polycyclic arenyl ligand, including substituted and unsubstituted indenyl, fluorenyl, heterocyclopentadienyl, heterophenyl, heteropentalenyl, heterocyclopentapentalenyl, heteroindenyls, heterofluorenyl, heterocyclopentanaphthyls, heterocyclopentaindenyls, heterobenzocyclopentaindenyls and the like.

As noted, other suitable HMP catalyst compounds may be characterized as bridged fluorenyl-cyclopentadienyl group 4 complexes. In some embodiments, the fluorenyl-cyclopentadienyl group 4 complexes include compounds of the general formula (3a):

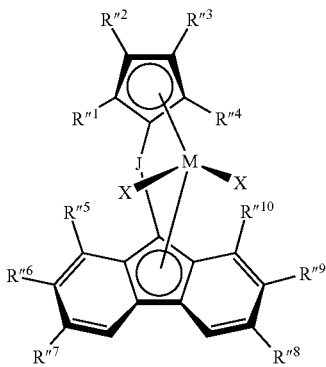

where: (1) J is a divalent bridging group (preferably comprising C, Si, or both); (2) M is a group 4 transition metal (with Hf being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure. In certain embodiments, the bridging group, J, is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ containing hydrocarbyl or substituted hydrocarbyl and optionally two or more adjacent $R^*$ may join to form a substituted or unsubstituted, saturated, partially unsaturated or aromatic, cyclic or polycyclic substituent. In some embodiments J is a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, $SiMePh$, $Ph_2C$, $(p\text{-}(Et)_3SiPh)_2C$, $Si(CH_2)_3$, $Si(CH_2)_4$ and $Si(CH_2)_5$. Alternately J may be any of the groups described for "J" in the VTP catalysts above.

In particular embodiments, J includes two aryl moieties bonded thereto ($Ar^1$ and $Ar^2$). In certain embodiments, at least one of the $Ar^1$ and $Ar^2$ contains at least one hydrocarbylsilyl substituent group having the formula $R^{*'}_n SiR''_3$, where each $R''$ is independently a $C_1$-$C_{20}$ hydrocarbyl, substituted hydrocarbyl, halocarbyl, substituted halocarbyl, silylcarbyl, or substituted silylcarbyl substituent, $R^{*'}$ is a $C_1$-$C_{10}$ substituted or unsubstituted alkyl, alkenyl, and/or alkynyl linking group between Si and the aryl group, and n=0 or 1. For example, when n is 0, one or both of $Ar^1$ and $Ar^2$ may be trimethylsilylphenyl ($Me_3SiPh$), triethylsilylphenyl ($Et_3SiPh$), tripropylsilylphenyl ($Pr_3SiPh$), etc. Similarly, when n is 1, $R^{*'}$ is present as a linking group, for example a $C_2$ linking group (e.g., ethyl linking group), then one or both of $Ar^1$ and $Ar^2$ may be (trimethylsilyl)ethylphenyl ($Me_3SiCH_2CH_2Ph$), and so on.

In certain embodiments, each X is selected in accordance with the previously-described HMP compounds. For instance, each X may be a chloro, bromo, methyl, ethyl, propyl, butyl or pentyl group. In specific embodiments, each X is a methyl group.

In some embodiments, each $R'''^1$, $R'''^2$, $R'''^3$, $R'''^4$, $R'''^5$, $R'''^6$, $R'''^7$, $R'''^8$, $R'''^9$, and $R'''^{10}$ is independently selected from the following: H; $CH_3$; $CH_2CH_3$; $CH_2CH_2CH_3$; $CH_2(CH_2)_2CH_3$; $CH_2(CH_2)_{3\text{-}30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_6H_5$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$.

Any one or more of $R'''^1$, $R'''^2$, $R'''^3$, $R'''^4$, $R'''^5$, $R'''^6$, $R'''^7$, $R'''^8$, $R'''^9$, and $R'''^{10}$ may be H, methyl, ethyl, n-propyl, i-propyl, s-butyl, i-butyl, n-butyl, t-butyl, and so on for various isomers for $C_5$ to $C_{10}$ alkyls. In certain embodiments, $R'''^6$ and $R'''^9$ may be t-butyl. In some such embodiments, $R'''^1$, $R'''^2$, $R'''^3$, $R'''^4$, $R'''^5$, $R'''^7$, $R'''^8$, and $R'''^{10}$ may each be independently selected from H, methyl, and ethyl. In certain embodiments, each $R'''^1$-$R'''^{10}$ group other than $R'''^6$ and $R'''^9$ is H.

Thus, for example, in embodiments wherein (1) $R'''^6$ and $R'''^9$ are each t-butyl as discussed above; (2) $R'''^1$-$R'''^4$, $R'''^5$, $R'''^7$, $R'''^8$, and $R'''^{10}$ are each H, as also discussed above; (3) $Ar^1$ and $Ar^2$ are each $Et_3SiPh$; (4) J is C; (5) M is Hf; and (6) each X is methyl, an example HMP catalyst accordingly can be given as 1,1'-bis(4-triethylsilylphenyl)methylene-(cyclopentadienyl)(2,7-di-tert-butyl-fluoren-9-yl)hafnium dimethyl. Similar example HMP catalysts include: dimethylsilylene (cyclopentadienyl)(2,7-di-tert-butyl-fluoren-9-yl) hafnium dimethyl; diphenylmethylene(cyclo-pentadienyl) (2,7-dimethylfluoren-9-yl)hafnium dimethyl; isopropylidene (cyclopentadienyl)(fluoren-9-yl)hafnium dimethyl; and diphenylmethylene(cyclopentadienyl) (fluoren-9-yl)hafnium dimethyl.

Also contemplated in other embodiments are catalysts similar to the Cp-fluorenyl catalysts (herein referred to by the shorthand "Cp-fluorenyl variants"), wherein either or both of: (1) the Cp moiety of general formula 3a (i.e., the Cp ring to which $R'''^1$-$R'''^4$ are appended) is instead another suitable monocyclic arenyl ligand, e.g., a substituted or unsubstituted heterocyclopentadienyl ligand pi-bonded to M; and (2) the fluorenyl moiety of general formula 3a (i.e., the fluorenyl polycyclic ring to which $R'''^5$-$R'''^{10}$ are appended) is instead another suitable polycyclic arenyl ligand, e.g., a substituted or unsubstituted htereocyclopentapentalenyl or heterofluorenyl ligand pi-bonded to M. All other groups in such embodiments may be as previously described for the general formula (3a) above.

Figure 20:
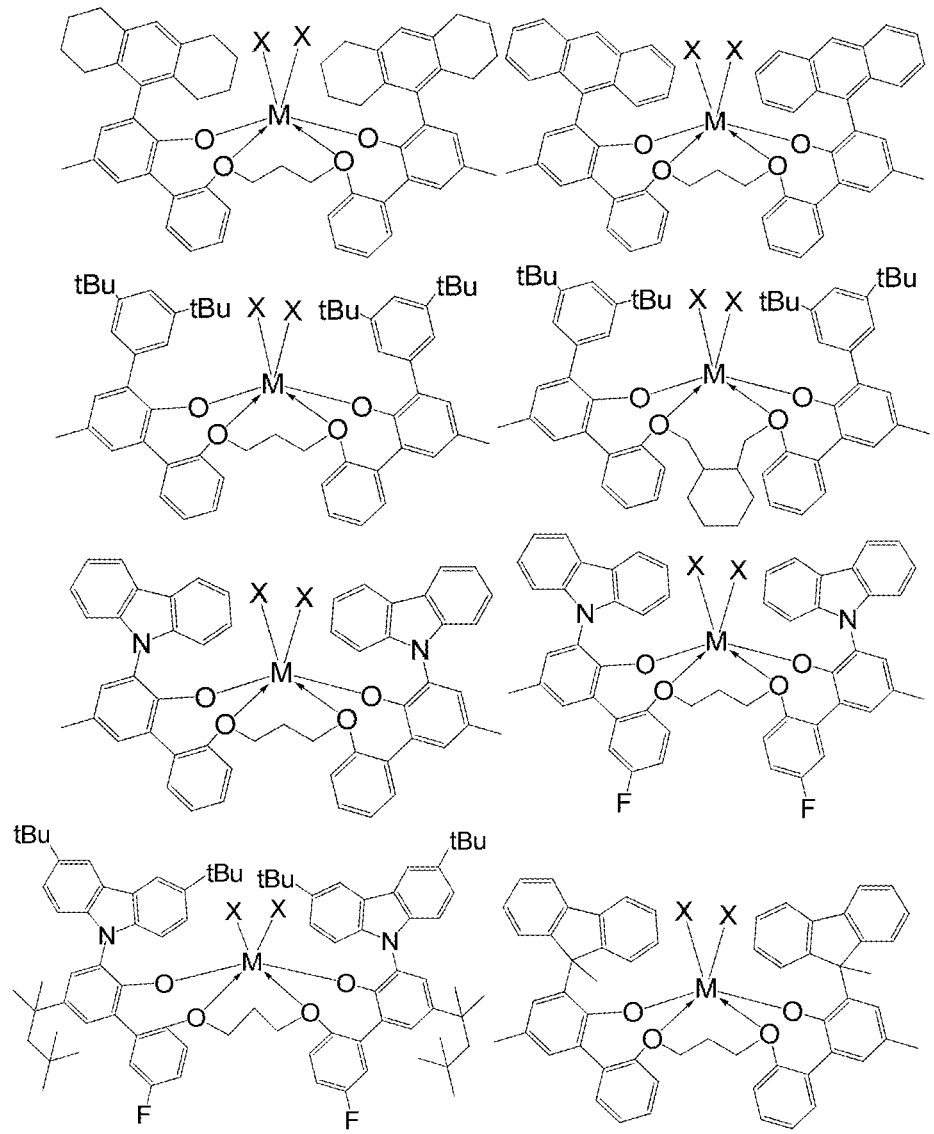
FIG. 20 illustrates biphenyl phenols useful as HMP catalysts of some embodiments.

As noted, HMP catalysts of yet other embodiments may include any useful catalyst for producing high molecular weight polymers, such as biphenyl phenol transition metal complexes. Useful biphenyl phenol transition metal complexes are described in WO2003/091262, WO2005/108406, US2006/0025548, US2006/0052554, WO2007/136494, WO2007/136496, WO2007/136495, WO2009/064482, and WO2013/096573, and are incorporated herein by reference. Particular examples are illustrated in FIG. 20.

Figure 21:
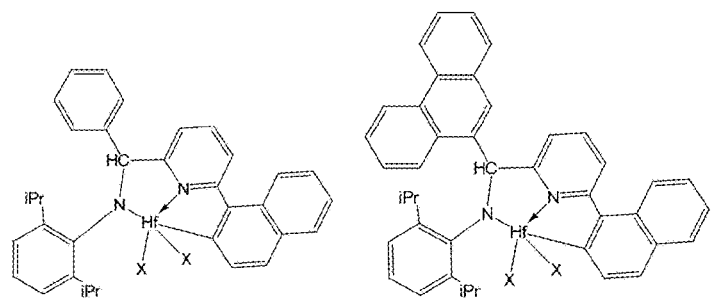
FIG. 21 illustrates chelated transition metal complexes (type 2) useful as HMP catalysts in some embodiments.

In yet further embodiments, suitable HMP catalyst compounds may be characterized as chelated transition metal complexes (e.g., pyridyl amide transition metal complexes). Particularly useful chelated transition metal complexes (type 2) including pyridyl amide transition metal complexes are described in WO2010/0227990, US2004/0220050, WO2004/026925, WO2004/024740, WO2004/024739, WO2003/040201, and WO2002/046249, WO2002/038628, and are incorporated by reference. Particular examples are shown in FIG. 21.

Figure 22:
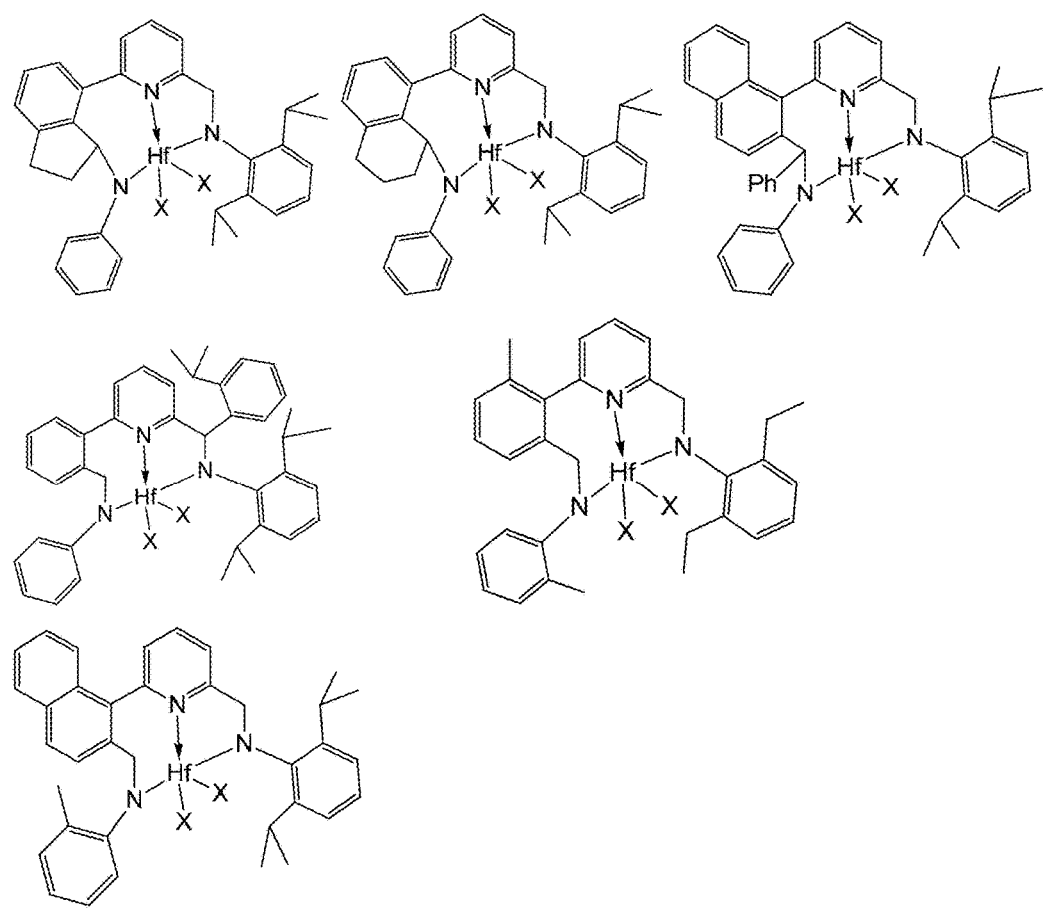
FIG. 22 illustrates chelated transition metal complexes (type 3) useful as HMP catalysts in some embodiments.

In yet further embodiments, suitable HMP catalyst compounds may be characterized as chelated transition metal complexes (type 3), such as pyridyl diamide transition metal complexes. Particularly useful chelated transition metal complexes (type 3) including pyridyl diamide transition metal complexes are described in US 2014/0316089, WO2012/134614, WO2012/134615, WO2012/134613, US 2012/0071616, US 2011/0301310, and US 2010/0022726 and are incorporated by reference. FIG. 22 illustrates some examples of such HMP catalysts.

As noted previously, the HMP catalyst system further comprises an activator, as well as optional support and co-activator(s). Suitable activators, optional supports, and optional co-activator(s) are discussed in greater detail below.

HMP and VTP Catalyst System Activators

The terms "cocatalyst" and "activator" are used herein interchangeably and are defined to be any compound which can activate any one of the catalyst compounds described above (including either or both of the HMP catalyst compounds and VTP catalyst compounds) by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Particular activators include alumoxane compounds, modified alumoxane compounds, and ionizing anion precursor compounds that abstract a reactive, σ-bound, metal ligand making the metal complex cationic and providing a charge-balancing noncoordinating or weakly coordinating anion. Any activator as described in Paragraphs [0110]-[0133] of U.S. Patent Publication No. 2015/0025209, which description is incorporated herein by reference, may be used as the activator of either or both of the HMP and VTP catalyst systems.

Bulky activators as described therein are particularly useful NCAs. "Bulky activator" refers to anionic activators represented by the formula:

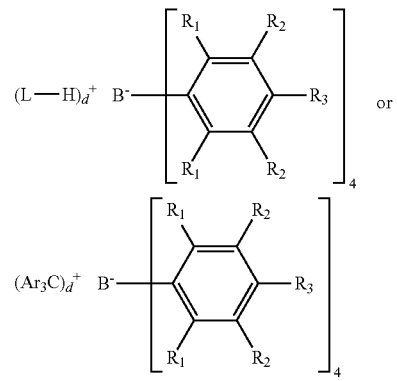

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; (L-H)⁺ is a Bronsted acid; d is 1, 2, or 3; wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å. Molecular volume is determined as described in Paragraphs [0122]-[0123] of US 2015/0025209 (already incorporated by reference herein).

Particularly useful Bulky activators include those listed in Paragraph [0124] of US2015/0025209, and also those listed in Columns 7 and 20-21 in U.S. Pat. No. 8,658,556, which description is also incorporated by reference herein. Particular examples of suitable NCA activators include: N,N-dimethylanilinium tetra(perfluorophenyl)borate; N,N-dimethylanilinium tetrakis (pentafluorophenyl)borate; N,N-dimethylanilinium tetrakis(perfluoronaphthyl)borate, N,N- dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Ph$_3$C$^+$] [B(C$_6$F$_5$)$_4$$^-$], [Me$_3$NH$^+$] [B(C$_6$F$_5$)$_4$$^-$]; 1-(4-(tris(pentafluorophenyl)borate)-2,3,5,6-tetrafluorophenyl)pyrrolidinium; tetrakis(pentafluorophenyl)borate, 4-(tris(pentafluorophenyl)borate)-2,3,5,6-tetrafluoropyridine, bis(C$_4$-C$_{20}$alkyl)methylammonium tetrakis (pentafluorophenyl)borate and bis(hydrogenated tallowalkyl)methylammonium tetrakis(pentafluorophenyl) borate.

In another embodiment, one or more of the NCAs is chosen from the activators described in U.S. Pat. No. 6,211,105. It is also within the scope of this invention that either or both of the HMP and VTP catalyst compounds can be combined with combinations of alumoxanes and NCAs.

Any of the activators (alumoxanes and/or NCAs) may optionally be mixed together before or after combination with the catalyst compound, preferably before being mixed with either or both of the HMP and VTP catalyst compounds.

In some embodiments, the same activator or mix of activators may be used for both the HMP and VTP catalyst compounds. In other embodiments, however, different activators or mixtures of activators may be used for each of the HMP and VTP catalyst compounds. For example, in one embodiment: (i) an activator such as N,N-dimethylanilinium tetrakis(perfluoronaphthyl)borate may be used to activate a VTP catalyst compound (in other words, the VTP catalyst system may comprise VTP catalyst compound and N,N-dimethylanilinium tetrakis(perfluoronaphthyl)borate; and (ii) an activator such as N,N-dimethylanilinium tetrakis (pentafluorophenyl)borate may be used to activate a HMP catalyst compound (that is, the HMP catalyst system may comprise HMP catalyst compound and N,N-dimethylanilinium tetrakis(pentafluorophenyl)borate).

Further, the typical activator-to-catalyst molar ratio for each of the HMP and VTP catalysts (e.g., all activators-to-HMP catalyst or all activators-to-VTP catalyst ratio) is 1:1. Alternate preferred ranges include from 0.1:1 to 100:1. For instance, activator-to-catalyst molar ratio may range from about 0.5:1 to 100:1, such as 2:1 to 50:1, although it may in some embodiments be as high as 1000:1.

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. In embodiments wherein both the HMP and VTP catalyst systems are utilized in one polymerization zone (e.g., in a process using a multiple catalyst system as described in more detail below, such as a dual catalyst system), each of the HMP and VTP catalyst compounds may be contacted with their respective activator (s) (which, again, may be the same or different) before being mixed together. Where the same activator is used for each, a mixture of HMP and VTP catalyst may be contacted with activator (either before or along with feeding of monomers to the catalyst mixture).

In addition to the activator compounds, scavengers or co-activators may be used in either or both of the HMP and VTP catalyst systems. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

In certain embodiments, either or both of the HMP and VTP catalyst system may comprise an inert support material, such as any support material described in [00108]-[00114] in U.S. Ser. No. 14/325,474, filed Jul. 8, 2014, and published on Jan. 22, 2015 as US 2015/0025210, which is incorporated herein by reference. Preferably the supported material is a porous support material, for example, talc, and inorganic oxides. Other support materials include zeolites, clays, organoclays, or any other organic or inorganic support material and the like, or mixtures thereof.

Suitable α-Olefin and Diene Monomers

As noted, the polymerization processes described herein utilize one or more monomers as input (e.g., to the multiple catalyst system, or to be contacted with an HMP catalyst system along with one or more VTPs, and/or to be contacted with a VTP catalyst system to form one or more VTPs). Similarly, polymer compositions (described in more to detail below) include polymers comprised of one or more monomers. Polymer compositions may include homopolymers, copolymers, or both. Monomers suitable for both the processes and polymer compositions described herein are described in greater detail in the following.

Processes according to particular embodiments produce copolymer compositions. For instance, in certain process embodiments, multiple different monomers are contacted with the VTP catalyst system and/or the HMP catalyst system. However, in process embodiments where VTP is used in a polymerization process like another monomer (e.g., where VTP is co-fed to the polymerization with the monomer(s)), it is possible to produce a copolymer composition while utilizing only one type of additional monomer with the VTP, so long as the VTP is itself either a copolymer or is comprised of different monomeric units. For instance, ethylene monomers may be utilized with an ethylene-propylene VTP, so as to produce a copolymer composition comprising units derived from ethylene and propylene. In particular embodiments, the one or more monomers further include one or more dienes, regardless of the variant of the polymerization process employed.

Each of the one or more monomers used in processes (and/or included in polymer compositions) herein is independently selected from C$_2$-C$_{40}$ α-olefins, preferably C$_2$ to C$_{20}$ α-olefins, more preferably C$_2$ to C$_{12}$ α-olefins (e.g., ethylene, propylene, butene, pentene, hexene, heptene, octene, nonene, decene, undecene, dodecene and isomers thereof).

In general, then, exemplary C$_2$ to C$_{40}$ α-olefin and cyclic olefin monomers and comonomers include ethylene, propylene, butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexene, heptene, octene, nonene, decene, dodecene, cyclooctene, 1-hydroxy-4-cyclooctene, 1-acetoxy-4-cyclooctene, 5-methylcyclopentene, cyclopentene, and any combination thereof.

In certain embodiments, the one or more monomers include both a first C$_2$-C$_{12}$ α-olefin and a second C$_2$-C$_{12}$ α-olefin different from the first. In particular of these embodiments, the first monomer is ethylene, and the second monomer is an α-olefin other than ethylene. For instance, the second monomer may be a C$_3$-C$_{12}$ or C$_3$-C$_8$ α-olefin, such as one of those identified previously. In particular embodiments, the second monomer is propylene, butene (e.g., 1-butene), or hexene (e.g., 1-hexene). In yet further embodiments, the one or more monomers includes both propylene and butene in addition to the ethylene.

As noted, in particular embodiments, the plurality of monomers may further include one or more polyenes, in addition to the first, second, and/or third (and/or more) $C_2$-$C_{12}$ α-olefins. Suitable polyene monomers include any hydrocarbon structure, preferably $C_4$ to $C_{30}$, having at least two unsaturated bonds. Preferably the polyene is a nonconjugated diene with at least two unsaturated bonds, wherein one of the unsaturated bonds is readily incorporated into a polymer. The second bond may partially take part in polymerization to form cross-linked polymers but normally provides at least some unsaturated bonds in the polymer product suitable for subsequent functionalization (such as with maleic acid or maleic anhydride), curing or vulcanization in post polymerization processes. Examples of dienes include, but are not limited to butadiene, octadiene, decadiene, hexadiene, and other $C_7$ to $C_{30}$ alkenes, as well as polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to, dicyclopentadiene, and alkenyl alkylidene, cycloalkylenoyl, and cylcoalkylidene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB)]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB), which has two unsaturated bonds (but only one of which is polymerizable) is a preferred diene in particular embodiments. During polymerization, ENB is incorporated into a growing polymer chain through the endocyclic double bond only; leaving the exocyclic double bond unreacted. Since it is unreactive during the polymerization, no reactor crosslinking can occur. The unreacted double bond is available for use (e.g., crosslinking and functionalization) post-reactor. Thus, polymer compositions of some embodiments are free of polyenes having more than one polymerizable unsaturated bond.

Diene monomers as utilized in yet other embodiments have at least two polymerizable unsaturated bonds that can readily be incorporated into polymers to form cross-linked polymers. A polymerizable bond of a diene is referred as to a bond which can be incorporated or inserted into a polymer chain during the polymerization process of a growing chain. For polymerization using metallocene catalysts, examples of such dienes include α,ω-dienes (such as butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene) and certain multi-ring alicyclic fused and bridged ring dienes (such as tetrahydroindene; 7-oxanorbornadiene, dicyclopentadiene; bicyclo-(2.2.1)-hepta-2,5-diene; 5-vinyl-2-norbornene (VNB); 3,7-dimethyl-1,7-octadiene; 1,4-cyclohexadiene; 1,5-cyclooctadiene; 1,7-cyclododecadiene and vinyl cyclohexene). The content of polyene with at least two polymerizable bonds in a polymer composition according to some embodiments is less than 0.5 wt %, preferably less than 0.1 wt % of the polymer composition.

Polymer compositions (and/or polymerization processes) of particular embodiments utilize ethylene, propylene, and ENB monomers (e.g., the processes produce, and/or the polymer composition comprises or consists of, ethylene-propylene-ENB terpolymers). In such embodiments, the diene content is preferably less than any one of 15, 10, 5, 1, and 0.1 wt % of the total weight of the ethylene terpolymer.

Copolymers and copolymer compositions formed from a plurality of monomers comprising both ethylene and propylene (or from ethylene monomers and homopolypropylene or ethylene-propylene copolymer VTPs; or from propylene monomers and homopolyethylene or ethylene-propylene VTPs; etc.) may in general be characterized as ethylene-propylene (EP) copolymers. Such copolymers may optionally include units derived from a diene monomer, as well (e.g., as a third, fourth, or other monomer, and/or incorporated into the VTP), such that polymers formed according to such embodiments may be designated as EP(D)M polymers, indicating the optional inclusion of diene-derived units. Where such diene-derived units are present, the copolymer is more particularly characterized as an EPDM copolymer. Furthermore, EP(D)Ms and/or EPDMs according to some embodiments may be formed from a plurality of monomers including another α-olefin comonomer, such as 1-butene, in addition to the propylene comonomer.

Vinyl-Terminated Polymers

In some embodiments, VTPs are formed by contacting one or more of the monomers described above with a VTP catalyst system, and/or with a multiple catalyst system comprising VTP and HMP catalyst systems. Alternatively, VTPs may be obtained from any suitable source and utilized in polymerization processes of other embodiments (e.g., analogously to a monomer, in embodiments where VTP and one or more additional monomers are contacted with an HMP catalyst system).

Suitable VTPs and/or VTPs produced by VTP catalyst systems include polymers having at least 60% vinyl terminations. In most embodiments, more vinyl termination is better. Accordingly, in particular embodiments, the VTP is a polymer having at least 60, preferably at least 70, 75, 80, 85, 90, 95, 96, 97, 98, or even 99% vinyl terminations in certain embodiments). Percentage vinyl termination is relative to the total number of end-group unsaturations in the VTPs (i.e., excluding unsaturation from diene monomers such as ENB, if present).

The numbers of vinyl, vinylidene, and vinylene chain ends are determined using $^1$H NMR with 1,1,2,2-tetrachloroethane-$d_2$ as the solvent on an at least 400 MHz NMR spectrometer. This may further be confirmed by $^{13}$C NMR. Proton NMR data is collected at 120° C. in a 5 mm probe using a Varian spectrometer with a $^1$H frequency of at least 400 MHz. Data was recorded using a maximum pulse width of 45°, 5 sec between pulses and signal averaging 120 transients. Spectral signals were integrated and the number of unsaturation types per 1000 carbons was calculated by multiplying the different groups by 1000 and dividing the result by the total number of carbons.

The chain end unsaturations are measured as follows. The vinyl resonances of interest are between from 5.0-5.1 ppm (VRA), the vinylidene resonances between from 4.65-4.85 ppm (VDRA), the vinylene resonances from 5.31-5.55 ppm (VYRA), the trisubstituted unsaturated species from 5.11-5.30 ppm (TSRA) and the aliphatic region of interest from 0-2.1 ppm (IA).

The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2)25+TSRA) and the number of trisubstituted groups from the formula (TSRA*1000)/((IA+VRA+VYRA+VDRA)/2)+TSRA).
VRA, VDRA, VYRA, TSRA and IA are the integrated normalized signal intensities in the chemical shift regions defined above. Vinyl chain ends are reported as a molar percentage of the total number of moles of unsaturated polymer end-groups (that is, the sum of vinyl chain ends, vinylidene chain ends, vinylene chain ends, and trisubstituted olefinic chain ends).

When the VTP contains a diene such as ENB, the calculation of number of vinyl chain ends should be modified. For instance, where a VTP contains ENB, vinyl chain ends are reported as a molar percentage of the total number of moles of the sum of vinyl chain ends, vinylidene chain ends, and vinylene chain ends. That is, trisubstituted olefinic chain ends are excluded when calculating the molar percentage. This is because of the overlap with the exocyclic olefinic region of ENB. Similar types of corrections are required when other dienes (or other polyenes) are used as monomers, as will be recognized by one of ordinary skill in the art with the benefit of this disclosure. For instance, it is known that when 1,5-octadiene is used a diene monomer, a polymer chain incorporating such dienes would include unreacted unsaturations in the form of vinylenes, so the vinylene groups would need to be excluded in the calculation of number of vinyl groups. Similar exclusions for other diene monomers, when present, will be apparent based upon the unreacted unsaturation type that such other diene monomers bring to the polymer chain. Where no diene monomers are present, the vinyl chain end calculation may include the sum of all of the above types of groups (vinyl, vinylidene, vinylene, and trisubstituted groups).

Additionally, for polymers excluding diene monomers (such as ENB), the total number of unsaturated chain ends may be characterized by using bromine electrometric titration, as described in ASTM D 1159. The bromine number obtained is useful as a measure of the unsaturation present in the sample. In embodiments herein, VTPs have a bromine number which, upon complete hydrogenation, decreases by at least any one of 50, 55, 60, 65, 70, 75, 80, 85, 90, and 95%.

In certain embodiments, at least 50% of the VTP polymers have at least one chain-end unsaturation (of any kind).

The monomeric make-up of VTPs may vary across various embodiments, in accordance with the above-described identification of α-olefin and polyene monomers. Thus, VTPs may be homopolyethylene or homopolypropylene. In other embodiments, VTPs may be a copolymer, such as an EP(D)M. In particular embodiments, VTPs may comprise units derived from ethylene, one or more $C_3$-$C_{12}$ α-olefins (e.g., propylene and/or 1-butene), and one or more polyenes (e.g., a deiene such as ENB). In such embodiments, VTPs may comprise from about 40 to about 80 wt % ethylene-derived units, from about 0.1 to about 20 wt % polyene-derived units (preferably diene-derived units), and the balance one or more $C_3$-$C_8$ α-olefins.

VTPs according to specific embodiments include ethylene-derived units in an amount ranging from a low of any one of about 25, 30, 35, 40, 45, 50, 55, 60, 65, and 70 wt % to a high of any one of about 30, 35, 40, 45, 50, 55, 60, 65, 70, 75, 80, 85, 90, 95, and 100 wt %, provided that the high end of the range is greater than the low end. Further, where such VTPs also include one or more diene-derived units, the VTPs may include diene-derived units in an amount ranging from a low of any one of about 0.1, 0.5, 1, 5, and 10 wt % to a high of any one of about 1, 2, 3, 4, 5, 6, 7, 8, 9, 10, 15, 20, 25, and 30 wt %, provided that the high end of the range is greater than the low end. The balance of these VTPs may be units derived from one or more $C_3$-$C_{12}$ α-olefins. In certain subsets of these VTPs, the balance of such VTPs may be made up of propylene-derived units, 1-butene-derived units, or a combination thereof.

VTPs may have Mw of 3,000 to 300,000 g/mol, such as within the range of 5,000 to 300,000 g/mol, 5,000 to 100,000 g/mol, or 5,000 to 80,000 g/mol, or 35,000 to 150,000 g/mol, or 40,000 to 200,000 g/mol, etc. In some embodiments, VTPs may have relatively high Mw, which may provide advantageous rheological properties when VTPs are incorporated into a HMP polymer chain (discussed in greater detail below). Thus, VTPs of such embodiments may have Mw of 40,000 g/mol or more, such as from 40,000 to 100,000 g/mol, or 40,000 to 130,000 g/mol. In yet other embodiments, VTPs may have moderate to low Mw, such as Mw less than or equal to any one of 50,000, 45,000, and 40,000 g/mol, such as from 3,000 to 50,000 g/mol, or from 5,000 to 45,000 g/mol. In such embodiments, VTPs may advantageously impart broad MWD (e.g., Mw/Mn of about 4 or more) in a reactor blend or other polymer composition comprising the VTPs.

VTPs according to some embodiments are highly branched, including long chain branching. Thus, in particular embodiments, the VTP may have a branching index ($g'_{vis}$) of 0.90 or less, preferably 0.87 or less, preferably 0.85 or less, preferably 0.80 or less, preferably 0.75 or less, preferably 0.70 or less, as determined by GPC, as described in the Test Methods section below. In certain embodiments, the VTP may have interrelated branching and vinyl terminations. In particular, a VTP may have at least X % vinyl chain ends (relative to total polymer chain-end unsaturations) as measured by $^1$H NMR, where X=47.8* $g'_{vis}$+45.1 (alternately X=47.8*$g'_{vis}$+46.1, alternately X=47.8*$g'_{vis}$+47.1).

In yet further embodiments, a VTP may be any of the "Polyolefin Products" described in Paragraphs [00133]-[00171] in U.S. Ser. No. 14/325,474, filed Jul. 8, 2014 and published on Jan. 22, 2015 as US 2015/0025210, and which was previously incorporated by reference herein.

High Molecular Weight Polymers

As noted previously, High Molecular Weight polymers (HMPs) as referenced herein, are labeled as a matter of convenience for differentiating from the above-described VTPs, and/or for differentiating polymers produced by HMP catalyst systems from those produced by VTP catalyst systems, for purposes of this disclosure. The use of the "HMP" label, alone, is not intended to restrict the molecular weight (e.g., Mw) of these or other polymers. Rather, suitable ranges of Mw for these polymers are described for various embodiments herein, and guidance should be taken from that description.

In general, HMPs may have the same monomer and/or comonomer content suitable as described for VTPs above. HMPs of particular embodiments are copolymers. For instance, HMPs may be ethylene-based copolymers having the ethylene, optional diene, and additional $C_3$-$C_{12}$ α-olefin derived content as noted previously for VTPs of various embodiments. HMPs of some embodiments are EP(D)M copolymers. HMPs of several embodiments, however, exhibit some differences from VTPs. For instance, although HMPs may have vinyl terminations, no particular amount is required for the HMPs utilized herein.

Further, HMPs may have lower ethylene content (on either a mol % or wt % basis) than VTPs. For instance, in some embodiments, HMPs may have at least any one of 3, 5, 10, 15, or 20 wt % less ethylene-derived content than a VTP. That is, for example, where a VTP comprises 60 wt % ethylene-derived content, a corresponding HMP may comprise only 50 wt % ethylene-derived content (i.e., 10 wt % less ethylene-derived content). This characteristic may be present due, e.g., to the HMP catalyst system's capacity for producing high comonomer content polymers. Where VTPs and HMPs are present in a blend (e.g., a reactor blend), ethylene content of each may be measured by separately polymerizing the VTP and HMP, respectively, under otherwise identical conditions.

Furthermore, HMPs in some embodiments have high Mw. For instance, HMPs may have Mw of 100,000. In various embodiments, HMPs may have Mw of at least any one of 50,000, 75,000, 100,000; 125,000; 150,000; and 180,000 g/mol. Although an upper limit of Mw is not necessary for HMPs according to some embodiments, HMPs according to yet other embodiments have Mw ranging from any one of the aforementioned low values to a high value of any one of about 190,000; 200,000; 230,000; 250,000; 280,000; 300,000; 350,000; 400,000; 450,000; 500,000; 550,000; and 600,000 g/mol. HMPS of some embodiments have Mw greater than VTPs (e.g., where both are present in a copolymer composition). In specific embodiments, HMPs may in part or in whole incorporate one or more VTPs (forming a sub-set of HMPs sometimes referenced herein for convenience as HMP-VTPs). It is believed that polymers incorporating one or more VTPs (e.g., polymers formed by copolymerization of the VTPs with one or more additional monomers with a HMP catalyst that incorporates the VTPs into the growing HMP) have long chain branching. The branches in such a polymer may be derived from the VTPs. A simplified illustration of this phenomenon according to certain embodiments is shown in FIG. 1, which illustrates a HMP catalyst (labeled "HMP" and shown in FIG. 1 with a growing polymer chain 105 appended thereto) incorporating a VTP 110 into the growing polymer chain 105, thereby resulting in a polymer chain 115 including a branch 111 formed from the VTP. Where VTPs themselves include long chain branching in accordance with some embodiments, the resulting HMP-VTP may therefore have a unique multiply-branching architecture, such as long chain branches which themselves include long chain branches, thereby imparting advantageous properties (e.g., melt elasticity and/or rheological properties, as discussed in more detail hereinbelow) on such a copolymer, or on a composition including such a copolymer.

High VTP concentration, low monomer concentration or high conversion condition are all of the favored conditions for VTP reinsertion into an HMP to create an HMP-VTP.

In addition, in such embodiments where the VTP is incorporated into the HMP, the VTPs may advantageously be designed and/or selected to achieve particular differentials of monomer incorporation among (i) the main polymer chain and (ii) branches in a polymer into which the VTP is incorporated. For instance, where the final desired polymer is a highly branched, high Mw EPDM, the diene content can be selectively focused in only the branches by copolymerizing a VTP including one or more diene-derived units with additional, non-diene, comonomer(s). Likewise, to obtain a final EPDM with little to no diene content in the branches, VTPs with substantially no diene-derived content may be copolymerized with a plurality of monomers including one or more dienes. As another example, monomers may be incorporated among both the branches and main backbone of a final polymer by copolymerizing VTPs with the same comonomers that make up the VTPs themselves. Furthermore, crystallinity can be selectively incorporated into such copolymers, such as by copolymerizing semi-crystalline VTPs with monomers to form an amorphous backbone, resulting in a polymer having amorphous backbone and semi-crystalline branches. On the other hand, amorphous VTPs can be copolymerized with monomers to form a semi-crystalline backbone (e.g., with propylene monomers) with amorphous branching.

Accordingly, various unique architectures of HMP-VTPs may be possible, such as: (i) comb-type polymers with amorphous backbones and semi-crystalline branches; (ii) comb-type polymers with semi-crystalline backbones and amorphous branches; (iii) polymers exhibiting bimodal molecular weight distribution, with controlled branching in the high and/or low Mw fraction; (iv) polymers with controlled incorporation of the diene (in the backbone, on the branches, or both, and/or with differential incorporation of dienes among the branches and/or backbone); (v) polymers with controlled branch-length to optimize rheological effect while minimizing impact on physical properties; and (vi) polymers with controlled distribution of branches along the main polymer backbone. Various other permutations of compositional distribution can be obtained in a similar manner, which will be apparent to an ordinarily skilled artisan with the benefit of this disclosure. As used herein with respect to polymer compositions, "bimodal" or "multimodal" molecular weight distribution refers to a bimodal or multimodal MWD (Mw/Mn) in a composition's polymer species, as determined according to the Test Methods section below regarding molecular weight.

Figure 11:
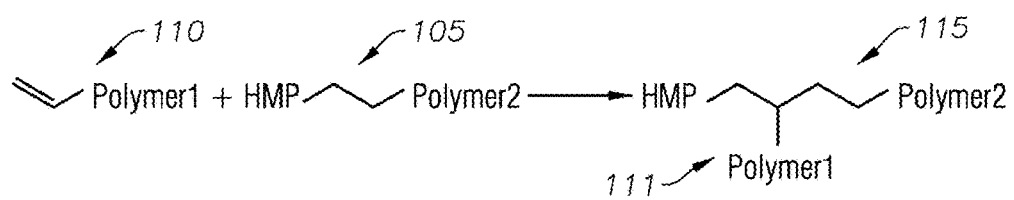
FIG. 11 is an illustrative schematic demonstrating incorporation of a VTP into a growing polymer chain in accordance with certain aspects of the present invention.

Furthermore, it will be understood by those of ordinary skill in the art that when the VTPs, as described herein, are reacted (e.g., copolymerized) with another material, the vinyl terminations of the VTPs are involved in the reaction and have been transformed, for instance as illustrated in FIG. 11 (wherein the vinyl end group of the VTP 110 becomes saturated during incorporation into the growing polymer chain 115). Thus, language indicating that a fragment of the final product is derived from a VTP, or similar language, is meant to refer to the fact that the VTP has been incorporated in the product. Similarly stating that a product or material comprises a VTP means that the reacted form of the VTP is present, unless the context clearly indicates otherwise (such as a mixture of ingredients that do not have a catalytic agent present).

Polymerization Processes

As noted previously, embodiments of the present invention include polymerization processes wherein a plurality of monomers comprising a plurality of VTPs and one or more additional monomers is contacted with a HMP catalyst system, thereby forming a polymer composition. Further, the VTPs may be obtained by polymerizing one or more monomers in the presence of a VTP catalyst system. Thus, a process according to some embodiments may include a single polymerization using the VTPs described herein, while processes according to other embodiments include at least two polymerizations (both VTP and HMP catalyst system polymerizations). Such embodiments may employ serial polymerization (e.g., VTP polymerization followed by HMP polymerization) or parallel polymerization (e.g., VTP polymerization and HMP polymerization in parallel, with products of each polymerization being blended). Some embodiments may include a multiple catalyst polymerization, wherein both VTP and HMP catalyst systems are employed together in a polymerization process (and/or multiple polymerization processes carried out in series or in parallel). Thus, exemplary processes may include, e.g., (i) multiple catalyst polymerization followed by polymerization in the presence of a VTP catalyst system and/or a HMP catalyst system; or (ii) VTP catalyst and/or HMP catalyst polymerization followed by multiple catalyst polymerization; or (iii) multiple catalyst polymerization (without other polymerizations), or plural multiple catalyst polymerizations; or (iv) VTP catalyst polymerization followed by HMP catalyst polymerization; or (v) HMP catalyst polymerization followed by VTP catalyst polymerization; or (vi) any combination of the foregoing. Each of these polymerizations may instead take place in parallel rather than in series (e.g., such that "followed by" is replaced with "in parallel with" in the foregoing descriptions). In such embodiments, at least a portion of the products of each polymerization may be blended together. Further, each of the aforementioned polymerizations may take place in a separate polymerization zone. A "polymerization zone," also referred to as a "reaction zone," is a vessel where polymerization takes place, e.g., a batch reactor or a continuous reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. All of these variations of polymerization processes according to such embodiments produce a polymer composition (which may or may not be the same where different permutations of the processes are used). Polymer compositions of various embodiments are described in greater detail below.

VTP catalyst and/or HMP catalyst may be premixed with activators, or mixed with activators in situ in a polymerization zone. Where both VTP and HMP catalyst systems are present together in a polymerization zone, the VTP catalyst and/or catalyst system, and the HMP catalyst and/or catalyst system, may similarly be pre-mixed and fed to the polymerization zone together, or added separately for mixture in situ. Such additions and mixings may be continuous or batchwise.

The polymerizations each utilize the monomers previously described herein. In some embodiments, any of the polymerizations may include a VTP (however formed) as a macromonomer. For example, processes according to some of these embodiments include: contacting (i) a VTP; (ii) one or more $C_2$-$C_{20}$ α-olefin monomers; and optionally (iii) one or more dienes, with a HMP catalyst system to form a polymer composition. In particular embodiments, the $C_2$-$C_{20}$ α-olefin monomer is ethylene, and the VTP is composed of units derived from one or more of ethylene, propylene, and, optionally, one or more dienes. In further embodiments, the one or more monomers further comprise a second $C_3$-$C_{20}$ α-olefin comonomer, such as propylene or 1-butene.

Similarly, processes of various embodiments may further include forming the VTP by contacting one or more monomers with a VTP catalyst system to produce the one or more VTPs used in the polymerization processes described immediately above.

A multiple-reactor system (e.g., serial or parallel polymerizations) according to some embodiments provides flexibility to control the molecular properties of the resulting polymer composition through adjusting process variables. Molecular weight, monomer content (e.g., ethylene content where ethylene is a first monomer), ratio of each polymer product blended into the resulting polymer composition all can be controlled though reaction temperature, catalyst feed rate and monomer concentration in each reactor. In one embodiment, the reaction temperature in a first polymerization zone is lower than the temperature in a second polymerization zone. The volume of reactor is another variable useful to adjust the ratio of two ethylene copolymers.

Processes according to some embodiments, as noted, include a multiple catalyst system comprising the VTP catalyst system and the HMP catalyst system. Such processes include copolymerizing a plurality of monomers in the presence of a multiple catalyst system comprising both a VTP catalyst system and an HMP catalyst system. The plurality of monomers in such embodiments comprises (i) a first $C_2$-$C_{20}$ α-olefin; (ii) a second $C_2$-$C_{20}$ α-olefin; and optionally (iii) one or more dienes. In particular embodiments, the multiple catalyst system is a dual catalyst system consisting of the VTP catalyst system and HMP catalyst system. Such processes allow for ready tuning of the polymer product through alteration of the catalyst feed ratios (that is, the ratio of VTP catalyst to HMP catalyst with which the plurality of monomers is contacted).

Suitable ratios of HMP catalyst compound to VTP catalyst compound may range from 0.5:1 up to 10:1. Thus, for instance, the ratio of HMP catalyst compound to VTP catalyst compound may be from 1:1 to 10:1, or from 1:1 to 7:1, or from 1:1 to 5:1, or from 1:1 to 2:1, or from 0.5:1 to 1:1, etc.

Each of the various polymerization processes of this invention can be carried out using general polymerization techniques known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media. A bulk process is defined to be a process where the monomer itself is used as the reaction medium and monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Since either batch or continuous polymerization processes may be used in accordance with the invention, references herein to monomer ratios and ratios of monomer feed rates should be considered interchangeable.

Furthermore, although known polymerization techniques may be employed, processes according to certain embodiments utilize particular conditions (e.g., temperature and pressure). Temperatures and/or pressures generally may include a temperature in the range of from about 0° C. to about 300° C. For example, polymerization temperatures may fall within the range of from about 40° C. to about 200° C., alternatively from about 45° C. to about 150° C., 70° C. to about 150° C., or, in particular embodiments, from about 70° C. to about 125° C. Pressure may depend on the desired scale of the polymerization system. For instance, in some polymerizations, pressure may generally range from about ambient pressure to 200 MPa, with 2 to 70 MPa preferred.

In a typical polymerization, the run time of the reaction is up to 300 minutes, preferably in the range of from 5 to 250 minutes, preferably 10 to 120 minutes. Alternatively, the run time of reaction may preferably be in a range of 5 to 30 minutes when a solution process is employed. The run time of reaction is preferably in a range of 30 to 180 minutes when a slurry or gas phase process is employed. The run time of reaction and reactor residence time are used interchangeably herein.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). Alternatively, 500 ppm or less of hydrogen is added into the reactor (including embodiments wherein no hydrogen is added). Alternatively, between 50 ppm, 100 ppm, or 200 ppm and 500 ppm of hydrogen may be added.

In a preferred embodiment, the polymerization is conducted in an aliphatic hydrocarbon solvent (e.g., isobutane, butane, pentane, isopentane, hexanes, isohexane, heptane, octane, dodecane, and mixtures thereof, and the like). Other additives may also be used in the polymerization, as desired, such as one or more scavengers, promoters, modifiers, chain transfer agents (such as dialkyl zinc, typically diethyl zinc), reducing agents, oxidizing agents, aluminum alkyls, or silanes.

A polymer can be recovered from the effluent of any one or more polymerizations by separating the polymer from other constituents of the effluent using conventional separation means. For example, polymer can be recovered from a polymerization effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Processes according to yet further embodiments may be described as those producing a blend of (i) low Mooney viscosity copolymer (e.g., ethylene copolymer) and (ii) high Mooney viscosity copolymer (e.g., ethylene copolymer). The process for the preparation of the reactor blend comprises: contacting a first metallocene catalyst system (e.g., a VTP catalyst system) with ethylene, diene and propylene monomers thereby producing a first polymer component (which may be, e.g., a VTP component) with low Mooney viscosity; contacting a second metallocene catalyst system (different from the first catalyst, e.g., a HMP catalyst system) with ethylene, diene and propylene monomers to produce a second polymer component (which may be, e.g., a HMP component); and controlling conditions in each reactor in order to obtain the first polymer component having a Mooney viscosity of less than 20 (1+4@125° C.) and the second polymer component having a Mooney viscosity of 40 or more (1+4@125° C.), such that the final blend product has a phase angle of 54 degree or less when measured at complex shear modulus G*=100,000 Pa and 125° C. and LCB index measured at 125° C. of less than 5. The final blend product may also or instead have overall Mooney viscosity of at least 40 (1+4@125° C.). Alternatively the final product has a tan δ of 0.5 or less measured at a frequency of 10 rad/sec and 125° C. The properties referred to according to these embodiments are described in greater detail below.

In particular of these embodiments, a multiple reactor process is employed to produce the low Mooney viscosity ethylene copolymer in one reactor, while a second reactor in series or parallel produces the high Mooney viscosity ethylene copolymer. The process for the preparation of the reactor blend comprises: contacting in a first reactor activated metallocene catalyst (e.g., a VTP catalyst system) with ethylene, diene and propylene monomers thereby producing an effluent containing a first polymer component (e.g., a VTP component) with low Mooney viscosity; feeding the effluent to a second reactor wherein activated metallocene catalyst (either the same or different from the first catalyst— where different, the second catalyst system may be a HMP catalyst system) is contacted with additional ethylene, diene and propylene monomers to produce a second polymer component and final product; and controlling conditions in each reactor in order to obtain the low Mooney viscosity first polymer component and the high Mooney viscosity second polymer component.

In another variation of polymer processes according to some embodiments, a single catalyst can be employed in a polymerization process using multiple polymerization zones. In other words, the first and the second catalysts can be the same compound. Process conditions such as reaction temperature, monomer concentration and monomer concentration ratio can be used to adjust the ethylene content and molecular weight of the inventive polymer composition desired for certain application. For example, higher polymerization temperature in one reactor could produce polymer with lower molecular weight for most metallocene and other single site catalysts. Therefore, different polymerization temperatures in reactors could produce a reactor blend with bimodal molecular weight distribution. Means to control molecular architecture using process variables will be apparent to those with ordinary skill in art with the benefit of this disclosure.

In yet further embodiments, the polymerization process may be characterized as a process for preparing a polymer composition according to any of the polymer compositions discussed in the following description.

Polymer Compositions

The polymer compositions formed according to the above processes may comprise reactor blends. In some embodiments, the reactor blends may contain any one or more of: (i) VTPs; (ii) HMPs; and (iii) HMP-VTPs. Such embodiments may comprise, for example, a reactor blend comprising: (a) a first copolymer component comprising a VTP having units derived from ethylene, a $C_3$-$C_{12}$ α-olefin, and optionally one or more dienes; and (b) a second copolymer component comprising a HMP having units derived from ethylene, a $C_3$-$C_{12}$ α-olefin, and optionally one or more dienes. The HMP may include either or both of HMP-VTPs and HMPs that do not incorporate VTPs, where the HMP-VTP has units derived from ethylene, a $C_3$-$C_{12}$ α-olefin, and optionally one or more dienes, and further incorporates one or more VTPs as discussed previously. The monomer make-up and content of the VTP, HMP, and/or HMP-VTP may be as previously described for each of these components. The reactor blends may be bimodal (or multimodal), and have MWD (Mw/Mn) of at least 3.5, or at least 4. Further, copolymer compositions of some embodiments exhibit any one or more of the following properties:

- Mooney Large viscosity ML (1+4 at 125° C.) of about 30 to 180 MU, such as about 50 to 150, 50 to 100, 70 to 150, 70 to 100, or 90 to 150 MU (Mooney Units). Mooney viscosity in terms of Mooney Small-Thin (MST) (5+4 at 200° C.) may range from 10 to 120 MU.
- cMLRA at Mooney Large Viscosity ML=80 mu (measured at 1+4@125° C.), such cMLRA ranging from about 240 to about 2000 mu*sec, such as about 500 to about 1950 mu*sec, or from about 500 to about 1050 mu*sec in other embodiments. In certain embodiments, cMLRA may be at least 500 mu*sec (without a necessary upper boundary), or at least 600 mu*sec, or at least 700 mu*sec.
- MLRA vs. ML such that the ratio of MLRA/ML is greater than R, where R is given by the equation R=9.57(ML)−40.83, where ML is the Mooney Large Viscosity of the polymer composition measured at (1+4@125° C.).
- Phase angle δ (measured at a complex modulus of $10^5$ Pa and a temperature of 125° C.) of less than 55, such as less than 54.5, or even less than 50, 45, or even 40. n further embodiments, phase angle δ is at least 10°, such as within the range from about 10° to about 40°. In further embodiments, phase angle δ may range from about 10° to about 35°.
- LCB index measured at 125° C. of less than 5, preferably less than 4 or even 3.
- Shear Thinning Ratio (ratio of the complex shear viscosity at frequency of 0.1 rad/sec to that at frequency of 100 rad/sec) greater than or equal to any one of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 (e.g., Shear Thinning Ratio of about 30 or more, about 42 or more, about 50 or more, etc.). The complex shear rheology is determined at 190° C.
- Shear thinning index STI measured at 125° C. greater than any one of 0.950, 0.955, 0.960, 0.965, 0.970, 0.975, 0.980, 0.985, and 0.990. In certain embodiments, STI may be greater than any thousandth in between the given numbers (e.g., greater than 0.978, 0.979, etc.).
- Relaxation time (determined at 125° C. using the Cross equation) of greater than 1.0, 1.5, or 2.0 seconds.
- Branching index ($g'_{vis}$) of less than 0.95, such as less than 0.91, or even less than 0.90 or less than 0.85.

In embodiments where a copolymer composition comprises ethylene, the copolymer composition may comprise 35 to 70 wt %, such as 40 to 60 wt %, ethylene, on the basis of the total weight of copolymers in the copolymer composition. When such compositions further include dienes, they may be present in amounts ranging from about 0.3 to about 15 wt %, such as about 0.5 to about 5, 10, or 15 wt %, on the basis of the total weight of copolymers in the copolymer composition. Where two or more copolymer components are present in the copolymer composition, the copolymer composition may exhibit a bimodal distribution in composition, as a function of molecular weight. In one embodiment, the ethylene content is higher at the lower molecular weight side than that at the high molecular weight side. The difference is of 5 wt % or more, preferably 10 wt % or more. Distribution in ethylene composition may be determined as described in the Test Methods section below regarding Molecular Weight and Composition Distribution.

In particular embodiments in which the composition comprises two or more copolymer components, the copolymer composition comprises a reactor blend of a first copolymer, the first copolymer having units derived from ethylene, a $C_3$-$C_{12}$ α-olefin, and optionally one or more polyenes; and a second copolymer, the second copolymer having units derived from ethylene, a $C_3$-$C_{12}$ α-olefin, and optionally one or more polyenes. The first copolymer may have ethylene content within the range of 30-80 wt %, and the second copolymer may have ethylene content within the range of 20-80 wt %, wherein the first copolymer has at least 5 wt % greater ethylene content than the second copolymer. In such embodiments, the ratio of Mw of the second copolymer to Mw of the first copolymer is at least any one of 1.5, 2, 3, 4, or 5. In certain of these embodiments, the second copolymer may be a HMP, and the first copolymer may be a VTP.

In certain of these embodiments comprising a reactor blend of two or more copolymers comprising the first and second ethylene, alpha-olefin and optional one or more diene copolymers, the first ethylene copolymer is a VTP. This copolymer may be a branched VTP having a branching index g'vis of 0.98 or less, preferably 0.95 or less. In some of these embodiments, it is believed that a distribution of cross-products are formed emanating principally from the grafting of the first VTP to the second ethylene copolymer (which may in particular ones of these embodiments be a HMP). These hybrid cross-products, also known as branch-block copolymers, form when the reactive VTP is reinserted into an ethylene copolymer molecule and participate in the polymerization of the ethylene copolymer. The presence of branch-block copolymers is believed to influence the events occurring during the polymerization as well as product properties. The extent of influence depends on the population distribution of the branch-block copolymer fraction.

In another embodiment, the ethylene content in the first and the second ethylene copolymer components are different. The difference is at least 5 wt %, preferably 10 wt %. Alternatively, the ethylene content of the first ethylene copolymer is higher than the ethylene content of the second copolymer by at least 5 wt %. The ethylene distribution of the reactor blend can be determined according to the description of Molecular Weight and Composition Distribution in the Test Methods section below. Ethylene content in each portion of the blend (e.g., in each of the first and second copolymer components) can be controlled according to polymerization processes of various embodiments. For instance, two or more catalyst systems (e.g., a VTP catalyst system and a HMP catalyst system) may be used to create the reactor blend, and the catalysts may be selected such that they produce polymers having different ethylene content. Alternatively or in addition, ethylene content in each fraction of the blend can be controlled through monomer concentration according to each catalyst's kinetic response of ethylene insertion rate. Or, in a process involving two or more polymerization zones, ethylene monomer feed to each zone may be varied to accomplish the differential in ethylene content among the fractions of the blend.

In one aspect, both of the first and second ethylene copolymers are amorphous. Alternatively one of the ethylene copolymer is amorphous and another one has low crystallinity.

Furthermore, the molecular weight may be different between the first and second ethylene copolymer components. In one embodiment, first ethylene copolymer component has a weight averaged molecule weight (Mw) of 50,000 g/mol or less, and the second ethylene copolymer component has an Mw of 100,000 or more. In yet other embodiments, Mw of the first copolymer component is in accordance with Mw for any of the VTPs discussed above, while Mw of the second copolymer component is in accordance with Mw for any of the HMPs discussed above. In one aspect of this invention, the Mw ratio of the second ethylene copolymer component to the first ethylene copolymer component is 1.5 or more, preferably 2.0 or more, more preferably 2.5 or more.

The amount of first ethylene copolymer component relative to the in-reactor blend may vary widely depending on the nature of the polymers and the intended use of the final polymer blend. In particular, however, one advantage of the process of the invention is the ability to be able to produce a reactor polymer blend in which the first ethylene copolymer component comprises more than 30 wt %, such as more than 40 wt % of the total reactor blend. The ratio of the two copolymers in the blend can be manipulated according to processes for producing such blends according to various embodiments. For instance, where two catalysts are used for producing the blend (e.g., a VTP catalyst system and a HMP catalyst system), the concentration ratio of the two catalysts can result in different amounts of the first and second copolymers of the blend. Preferably the ethylene copolymer having lower molecular weight (i.e., the first ethylene copolymer component, e.g., comprising a VTP ethylene copolymer) is of 80 or less, more preferably 70 or less, 60 or less, or even 50 or less wt % of the total blend. Catalyst concentration in each of one or more polymerization zones can be adjusted through catalyst feed rate to the reactor. In one embodiment, the molar ratio of the first catalyst feed rate (e.g., the VTP catalyst feed rate) to the second catalyst feed rate (e.g., the HMP catalyst feed rate) is in a range of 0.05 to 20.

Preferably, the first ethylene copolymer component has a Mooney viscosity (1+4 at 125° C.) of 10 mu or less and the second ethylene copolymer component has a Mooney viscosity (1+4 at 125° C.) of 20 mu or more. The reactor blend has a phase angle of 54.5° or less when measured at complex shear modulus G*=100,000 Pa and 125° C. and LCB index measured at 125° C. of less than 5, has an overall Mooney viscosity of at least 40 (1+4@125° C.). Alternatively the final product has a tan δ of 0.5 or less measured at a frequency of 10 rad/sec and a temperature of 125° C.

In yet further embodiments, the polymer composition may be characterized as a reactor blend of two or more of the following: a VTP; a HMP that does not incorporate a VTP; and a HMP-VTP. Thus, such embodiments may comprise, for example, a reactor blend comprising: (a) a VTP comprising units derived from ethylene, a $C_3$-$C_{12}$ α-olefin, and optionally one or more dienes; (b) an HMP comprising units derived from ethylene, a $C_3$-$C_{12}$ α-olefin, and optionally one or more dienes. The reactor blend in certain embodiments may further comprise; and (c) an HMP-VTP comprising units derived from ethylene, a $C_3$-$C_{12}$ α-olefin, and optionally one or more dienes, and further incorporating one or more VTPs. The monomer content of the VTP, HMP, and/or HMP-VTP may be as previously described for each of these components. In yet further embodiments, the composition comprises HMP-VTPs, without necessarily also comprising VTPs or HMPs according to the foregoing description.

Without being bound by theory, it is believed that the various different compositions as characterized according to these embodiments may result at least in part due to different levels of incorporation of VTPs into HMPs formed by polymerization processes according to various embodiments. For instance, where all or substantially all of the VTP is incorporated into the HMPs, the polymer composition may be said to comprise one or more HMP-VTPs. Where the incorporation is incomplete, the composition may further comprise VTPs (e.g., unreacted VTPs). Use of a sufficiently high degree of excess monomer(s) in polymerization with the VTPs (e.g., a ratio of other monomer(s) to VTP in excess of 5:1, 10:1, or 15:1) may further result in some HMP polymer chains that do not incorporate VTPs, thereby resulting in a polymer composition further comprising one or more HMPs that do not incorporate VTPs. In processes according to yet other embodiments, few or none of the VTPs may be incorporated into the HMPs. Thus, the polymer compositions of the foregoing embodiments may comprise any one or more of (i) VTPs, (ii) HMPs, and (iii) HMP-VTPs.

Functionalizing Copolymers

In some embodiments the polymers produced herein may be functionalized as described in U.S. Pat. No. 6,022,929; A. Toyota, T. Tsutsui, and N. Kashiwa, Polymer Bulletin 48, 213-219, 2002; and J. Am. Chem. Soc., 1990, 112, 7433-7434. For instance, the copolymers of the copolymer compositions may be functionalized by reacting a heteroatom-containing group with the copolymer with or without a catalyst. Any known functional group for functionalizing, or grafting, copolymers may be used (e.g., amines, aldehydes, alcohols, acids, anhydrides, sulphonates, particularly succinic acid, maleic acid and maleic anhydride). Such grafted copolymer compositions may find use as oil additives, as anti-fogging of wetting additives, adhesion promoters, and other applications.

Compounded Polymer Compositions

In another embodiment, the polymer composition produced herein further includes one or more additional polymers and/or additives, thereby forming a compounded polymer composition. Thus, processes of various embodiments may further include blending a polymer composition according to various above-described embodiments (e.g., a polymer composition of some embodiments) with one or more additional polymer components and/or additives. In general, any additional polymer component and/or any additive or other additional component suitable for a conventional EP or EPDM formulation will be suitable for compounding with polymer compositions of various embodiments described herein, particularly those embodiments in which the polymer composition is or comprises an EP or EPDM copolymer.

Suitable additives include any additive known in the art for elastomer formulations, such as EPDM formulations. Examples of additives include, but are not limited to, any one or more of: extender oils; carbon black; plasticizers; processing aids such as fatty acids, waxes, and the like; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); curatives or crosslinking agents (either or both of curing agents and co-agents, such as zinc oxide, peroxides, phenolic resins, and the like); fillers (including calcium carbonate, clay, silica and the like); antiozonants; scorch inhibiting agents; anti-cling additives; tackifiers (such as polybutenes, terpene resins, aliphatic and aromatic hydrocarbon resins, alkali metal and glycerol stearates, and hydrogenated rosins, and the like); UV stabilizers; heat stabilizers; anti-blocking agents; release agents; anti-static agents; pigments; colorants; dyes; talc; and other additives known in the art. "Extender oil" refers to a compound comprising carbon and hydrogen, which is a liquid at 25° C. Examples of extender oils include various types of paraffins and paraffin blends, dearomaticized aliphatic hydrocarbons, high purity hydrocarbon fluids, polyalphaolefins, polybutenes, mineral oils, and the like.

Other Applications

Any of the foregoing polymers, including compounds thereof, may be used in a variety of end-use applications, including any application suitable for EP or EPDM copolymers (e.g., films, weather seals, coolant hoses, roofing membranes, wire and cable insulation, and dynamically vulcanized alloys, power transmission belts, engine mounts, thermoplastic blends and the like).

Test Methods

Small Amplitude Oscillatory Shear (SAOS); Phase Angle δ; Shear Thinning Ratio; Shear Thinning Index (STI); Relaxation Time τ; Large Amplitude Oscillatory Shear (LAOS); Mooney Large Viscosity (ML); Mooney Large Relaxation Area (MLRA); corrected MLRA (cMLRA); molecular weights (number average Mn, weight average Mw, and z-average Mz); branching index $g'_{vis}$; and composition distribution are determined in accordance with the following description.

Small Amplitude Oscillatory Shear (SAOS):

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin (polymer composition) onto the parallel plates. To determine the samples' viscoelastic behavior for Examples 1-24 below, frequency sweeps in the range from 0.01 to 385 rad/s were carried out at a temperature of 190° C. under constant strain of 10%. A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle δ, is the inverse tangent of the ratio of G" (shear loss modulus) to G' (shear storage modulus). A similar procedure was used for Examples 25-32 below, except frequency sweeps were carried out at a temperature of 125° C. under constant strain of 14%. Each sample was loaded between the parallel plates of a rubber process analyzer (RPA) (ATD® 1000 rheometer from Alpha Technologies). The plates came together, the sample conditioned at 125° C. for 3 minutes, and then SAOS testing was run.

Shear Thinning Ratio:

Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 100 rad/sec.

Shear Thinning Index:

Another method of quantifying shear-thinning is to use a parameter called the shear-thinning index (STI), defined as:

$$STI = ((\eta_{0.1\ rad/s} - \eta_{128\ rad/s})/\eta_{0.1\ rad/s})$$

Where $\eta_{0.1\ rad/s}$ and $\eta_{128\ rad/s}$ are the complex shear viscosity at a frequency of 0.1 rad/s and 128 rad/s, respectively. The shear-thinning index typically increases with branching level; thus it is believed that for highly branched polymers (and/or polymer compositions that behave like highly branched polymers), the parameter STI approaches 1 since $\eta_{0.1\ rad/s} \gg \eta_{128\ rad/s}$. Conversely for Newtonian fluids, where the viscosity is independent of shear rate, STI approaches 0.

Relaxation Time:

Relaxation time τ may help indicate polydispersity/MWD and/or the presence long-chain branching in a polymer composition (or behavior of a polymer composition in a manner that emulates long-chain branched polymers). Relaxation time may be determined from the Cross Equation as used to model viscosity data collected over a range of frequencies. The viscosity data collected over a range of frequency can be fitted (e.g., via the least squares method) using the general form of the Cross Equation (J. M Dealy and K. F Wissbrun, Melt Rheology and Its Role in Plastics Processing Theory and Applications; Van Nostrand Reinhold: New York, p. 162 (1990):

$$\eta = \eta_\infty + (\eta_0 - \eta_\infty)/(1+(\dot{\gamma}\tau)^{1-n})$$

where η is the dynamic viscosity, $\eta_0$ is the limiting zero shear viscosity, $\eta_\infty$ the infinite shear viscosity, τ the relaxation time at the given frequency η, n the power law exponent describes the extent of shear thinning. For Newtonian fluid, n=1 and the dynamic complex viscosity is independent of frequency. For polymer of interest here, n<1, so that the enhanced shear thinning behavior is indicated by a decrease in n (increase in 1-n), and $\dot{\gamma}$ is the input shear frequency. The term $\eta_\infty$ is 0 from the curve fit, with the result the expression reduces to three parameters:

$$\eta = \eta_0/[1+(\dot{\gamma}\tau)^{1-n}]$$

This expression gives the relaxation time when testing is conducted at constant strain and constant temperature (as noted above for SAOS measurements for Examples 1-24 and 25-32, respectively). As noted, the relaxation time, τ in the Cross Model can be associated to the polydispersity and/or long-chain branching in the polymer. For increased levels of branching (and/or polymer compositions emulating increased levels of branching), it is expected that would be higher compared to a linear polymer of the same molecular weight.

Large Amplitude Oscillatory Shear (LAOS): The rheological properties of polymer compositions are studied using a rubber process analyzer (RPA) using a method according to the following description. Large Amplitude Oscillatory Shear (LAOS) can provide useful non-linear characteristics of polymers. LAOS can be described as the oscillatory strain domain where the shear complex modulus (G*) is a function of both the angular frequency and strain as compared with SAOS. LAOS tests are conducted using the ATD® 1000 rubber process analyzer commercialized by Alpha Technologies. The ATD® 1000 is a dynamic mechanical rheological tester designed for testing unfilled elastomers and compounds. Except where otherwise noted, Rheological tests using large amplitude oscillatory shear were carried out at a temperature of 125° C., strain amplitude of 1000% and frequency of 0.63 rad/sec. The input strain is represented by the function: $\gamma=\gamma_0 \sin(\omega t)$, where $\gamma_0$ is the strain amplitude. As can be seen, the function has a time dependence. The stress response of the polymer sample is measured using the following Fourier series, which is a function of time, angular frequency, and strain amplitude as shown below.

$$\sigma(t; \omega; \gamma_0) = \gamma_0 \sum_n \{G'(\omega, \gamma_0)\sin n\omega t + G''(\omega, \gamma_0)\cos n\omega t\}$$

G' and G" correspond to the real and imaginary components of the complex modulus, G*. Put another way, G' corresponds to the shear storage modulus (Pa), and G" to the shear loss modulus (Pa). The odd harmonics of this Fourier series ($G_1'$, $G_3'$, $G_5'$, etc.) are calculated by the RPA.

The long-chain branching (LCB) index is calculated according to the method described in Florian J. Stadlera, Adrien Leyguea, Henri Burhin, Christian Baillya, Polymer Reprints, 2008, 49(1) 121-122 (see also H. G. Burhin, N. Rossion, C. Bailly, A. Leygue, R. Kuenings, in FT Rheology and Large Amplitude Oscillatory Shear (LAOS), an interesting tool to study polymer architecture, International Rubber Conference IRC 2006, Lyon, France (2006); A. Leygue, N. Roisson, C. Bailly, R. Keunings, in Study of reversing flows of linear entangled polymers through constitutive models, AERC, Hersonisos, Crete, Greece (2006); and Burhin et. al., in XVth International Congress on Rheology, Monterey, Calif. (August 2008)). In particular, the following expressions are used:

$$LCB \text{ index} = \frac{G_1'}{G_5'} - E_3$$

$$E_3 = \frac{5}{4} + \frac{1}{4}\left(\frac{G_3'}{G_5'}\right)^2 - \frac{1}{2}\frac{G_3'}{G_5'}$$

where, $G_1'$, $G_3'$ and $G_5'$ are the first, third and fifth harmonic associated with the real component G' of the complex modulus (G*). Higher LCB index typically indicates increased polymer branching.

Mooney Large Viscosity (ML) and Mooney Relaxation Area (MLRA):

ML and MLRA are measured using a Mooney viscometer according to ASTM D-1646, modified as detailed in the following description. First, an oven-dried polymer sample for Mooney testing is prepared by being pressed into a flat sheet using a hot press at 150° C. for 3 minutes, to remove any water, solvent, and unreacted monomers from the sample. After 3 minutes, if there are any visible bubbles/voids, the sheet is folded and pressed again between the hot plates of the hot press for an additional 3 minutes. Once the sample is cooled, about 25 g is used for Mooney testing. For Mooney testing, the sample is placed on either side of the rotor. The cavity is filled by pneumatically lowering the upper platen. The upper and lower platens are electrically heated and controlled at 125° C. The torque to turn the rotor at 2 rpm is measured by a torque transducer. Mooney viscometer is operated at an average shear rate of $2 \text{ s}^{-1}$. The sample is pre-heated for 1 minute after the platens are closed. The motor is then started and the torque is recorded for a period of 4 minutes. The results are reported as ML (1+4) 125° C., where M is the Mooney viscosity number, L denotes large rotor, 1 is the pre-heating time in minutes, 4 is the sample run time in minutes after the motor starts, and 125° C. is the test temperature.

The torque limit of the Mooney viscometer is about 100 Mooney units. Mooney viscosity values greater than about 100 Mooney unit cannot generally be measured under these conditions. In this event, a non-standard rotor design is employed with a change in Mooney scale that allows the same instrumentation on the Mooney viscometer to be used for more viscous polymers. This rotor that is both smaller in diameter and thinner than the standard Mooney Large (ML) rotor is termed MST—Mooney Small Thin. Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4), 200° C. Note that the run time of 4 minutes at the end of which the Mooney reading is taken remains the same as the standard conditions. According to EP 1 519 967, one MST point is approximately 5 ML points when MST is measured at (5+4@200° C.) and ML is measured at (1+4@125° C.). The MST rotor should be prepared as follows:

1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

The MLRA data is obtained from the Mooney viscosity measurement when the rubber relaxes after the rotor is stopped. The MLRA is the integrated area under the Mooney torque-relaxation time curve from 1 to 100 seconds. The MLRA is a measure of chain relaxation in molten polymer and can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below $$cMLRA = MLRA\left(\frac{80}{ML}\right)^{1.44}$$

where MLRA and ML are the Mooney Relaxation Area and Mooney viscosity of the polymer sample measured at 125° C. Alternatively, the ratio MLRA/ML may be used to encompass both the MLRA and ML data, in view of MLRA's dependence upon ML. This ratio has the dimension of time. A higher MLRA/ML number signifies a higher degree of melt elasticity for materials with similar value of ML. Long chain branching will slow down the relaxation of the polymer chain, hence increasing the value of MLRA/ML.

Unsaturated Chain Ends:

The amount of unsaturated chain ends (vinyl terminations) was determined according to the procedure described earlier in the specification.

Molecular Weight:

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B columns for separation using a flow rate of 0.54 ml/min and a nominal injection volume of 300 microliter. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference.

Solvent for the SEC experiment was prepared by dissolving 6 grams of butylated hydroxy toluene (BHT) as an antioxidant in 4 liters of Aldrich reagent grade 1,2,4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cm$^3$, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn.

Branching Index ($g'_{vis}$):

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration and was determined from the DRI output.

The branching index (g'vis) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i[\eta]_i}{\sum c_i}$$

where the summations are over the chromatographic slices, i, between the integration limits.

The branching index $g'_{vis}$ is defined as:

$$g'_{vis} = \frac{[\eta]_{avg}}{kM_v^\alpha}$$

The intrinsic viscosity of the linear polymer of equal molecular weight and same composition is calculated using Mark-Houwink equation, where the K and α are determined based on the composition of linear ethylene/propylene copolymer and linear ethylene-propylene-diene terpolymers using a standard calibration procedure. $M_v$ is the viscosity-average molecular weight based on molecular weights determined by LS analysis. See Macromolecules, 2001, 34, pp. 6812-6820 and Macromolecules, 2005, 38, pp. 7181-7183, regarding selecting a linear standard having similar molecular weight and comonomer content, and determining k coefficients and α exponents.

Molecular weight and composition distribution (GPC-IR):

The distribution and the moments of molecular weight (e.g., Mn, Mw, Mz) and the comonomer distribution (C2, C3, C6, etc.), are determined with a high temperature Gel Permeation Chromatography (PolymerChar GPC-IR) equipped with a multiple-channel band filter based infrared detector ensemble IR5, in which a broad-band channel is used to measure the polymer concentration while two narrow-band channels are used for characterizing composition. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 micrometer Teflon filter and degassed with an online degasser before entering the GPC instrument. The nominal flow rate is 1.0 mL/min and the nominal injection volume is 200 microliter. The whole system including transfer lines, columns, detectors are contained in an oven maintained at 145° C. Given amount of polymer sample is weighed and sealed in a standard vial with 10 microliter flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at 22° C. and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I$$

where α is the mass constant determined with PE standard NBS1475. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of mono-dispersed polystyrene (PS) standards. The molecular weight is calculated at each elution volume with following equation.

$$\log M_X = \frac{\log(K_X/K_{PS})}{a_X + 1} + \frac{a_{PS} + 1}{a_X + 1} \log M_{PS}$$

where K and α are the coefficients in the Mark-Houwink equation. The variables with subscript "X" stand for the test sample while those with subscript "PS" stand for polystyrene. In this method, $\alpha_{PS}=0.67$ and $K_{PS}=0.000175$ while α and $K_X$ are determined based on the composition of linear ethylene/propylene copolymer and linear ethylene-propylene-diene terpolymers using a standard calibration procedure. The comonomer composition is determined by the ratio of the IR detector intensity corresponding to $CH_2$ and $CH_3$ channel calibrated with a series of PE and PP homo/copolymer standards whose nominal value are predetermined by NMR.

Ethylene content is determined using FTIR according the ASTM D3900 and is not corrected for diene content. ENB is determined using FTIR according to ASTM D6047. The content of other diene can be obtained using $C^{13}$ NMR.

EXAMPLES

Polymerization Examples 1-9

Polymerizations were carried out in a continuous stirred tank reactor system. The reactor was either a 1-liter or a 0.5-liter Autoclave reactor equipped with a stirrer, a water cooling/steam heating element with a temperature controller and a pressure controller. The reactor was maintained at a pressure in excess of the bubbling point pressure of the reactant mixture to keep the reactants in the liquid phase. The reactors were operated liquid full. Isohexane (solvent), and monomers (for Examples 1-9, monomers were ethylene and propylene) were purified over beds of alumina and molecular sieves. Toluene for preparing catalyst solutions was purified by the same technique. All feeds were pumped into the reactors by a Pulsa feed pump except for the ethylene, which flowed as a gas under its own pressure through a Brooks flow controller. Ethylene and propylene feeds were combined into one stream and then mixed with a pre-chilled isohexane stream that had been cooled to at least 0° C. The mixture was fed into the reactor through a single port. Similarly, activated Catalyst A solution and activated Catalyst B solution were fed using separate ISCO syringe pumps, with each activated catalyst feed stream being merged into one stream just before entering the reactor through a single feed tube.

An isohexane solution of tri-n-octyl aluminum (TNOA) (25 wt % in hexane, Sigma Aldrich) was added to the combined solvent and monomer stream just before it entered the reactor to further reduce any catalyst poisons. The feed rate of the scavenger solution was adjusted in a range from 0 (no scavenger) to 1.5E-05 mole per minute to optimize catalyst activity.

The catalysts used were [di(p-triethylsilylphenyl)methylene] (cyclopentadienyl) (2,7-di-tert-butylfluoren-9-yl)hafnium dimethyl catalyst (Catalyst A, corresponding to HMP catalysts of some embodiments) (obtained from Albemarle) and rac-cyclotetramethylenesilylene-bis(2,4,7-trimethylinden-1-yl)hafnium dimethyl (Catalyst B, corresponding to VTP catalysts of some embodiments, and prepared as described in U.S. Ser. No. 14/325,449, filed Jul. 8, 2014, and published Jan. 22, 2015 as US 2015/0025209, incorporated herein by reference). The Catalyst A was activated with N,N-dimethyl anilinium tetrakis (pentafluorophenyl) borate at a molar ratio of about 1:1 in 900 ml of toluene. The Catalyst B was activated with N,N-dimethylanilinium tetrakis(heptafluoro-2-naphthyl)borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. Examples 1-9 were made using only one 1-liter Autoclave reactor (single reactor polymerization). The detailed polymerization process conditions are listed in Table 1 for the ethylene copolymer. The scavenger feed rate was adjusted to optimize the catalyst efficiency, catalyst feed rates can be adjusted to reach the targeted properties listed. All the reactions were carried out at a pressure of about 2.4 MPa/g unless otherwise mentioned.

TABLE 1

Polymerization condition and some analytical data for EP copolymers

| Example # | 1 | 2 | 3 | 4 (comp) |
|---|---|---|---|---|
| Polymerization temperature (° C.) | 120 | 120 | 120 | 120 |
| Ethylene feed rate (std liter/min (SLPM)) | 6 | 6 | 6 | 6 |
| Propylene feed rate (g/min) | 6 | 6 | 6 | 6 |
| Isohexane feed rate (g/min) | 84.5 | 84.5 | 84.5 | 82.7 |
| Catalyst A feed rate (mol/min) | 7.584E−08 | 6.593E−08 | 4.709E−08 | 6.593E−08 |
| Catalyst B feed rate (mol/min) | 2.754E−08 | 3.855E−08 | 5.508E−08 | 0 |
| Molar ratio of Catalyst A to Catalyst B | 2.75 | 1.71 | 0.85 | |
| Polymer made (gram) | 246.9 | 241.9 | 234.4 | 176.2 |
| Conversion (%) | 64.4% | 63.1% | 61.1% | 68.9% |
| Complex shear viscosity at 0.1 rad/sec and 190° C. (Pa s) | 394,000 | 572,000 | 540,000 | 131,722 |
| Complex shear viscosity at 100 rad/sec and 190° C. (Pa s) | 2,444 | 2,962 | 2,215 | 3,676 |
| Phase angle at G* = 100,000 Pa (degree) | 24.2 | 21.8 | 18.5 | 45.2 |
| tan (delta) at G* = 100,000 Pa (—) | 0.45 | 0.4 | 0.33 | 1.01 |
| ML (1 + 4 at 125° C.) (mu) | 84.2 | 78.9 | 53.5 | 52.4 |
| MLRA (mu-sec) | 565.9 | 847.2 | 748.1 | 168.5 |
| cMLRA at 80 ML (mu-sec) | 526 | 864 | 1335 | 310 |
| MWD | 4.33 | 4.83 | 6.83 | 2.23 |
| Mn_LS (g/mol) | 74,112 | 60,797 | 41,033 | 95,519 |
| Mw_LS (g/mol) | 244,686 | 239,276 | 218,405 | 178,291 |
| Mz_LS (g/mol) | 523,301 | 492,174 | 457,513 | 285,029 |
| Ethylene (wt %) | 62.4 | 62.98 | 65.62 | 59.54 |

| Example # | 5 | 6 | 7 | 8 | 9 |
|---|---|---|---|---|---|
| Polymerization temperature (° C.) | 120 | 120 | 120 | 120 | 120 |
| Ethylene feed rate (SLPM) | 6 | 6 | 6 | 6 | 6 |
| Propylene feed rate (g/min) | 6 | 6 | 6 | 6 | 6 |
| Isohexane feed rate (g/min) | 82.7 | 82.7 | 82.7 | 82.7 | 82.7 |
| Catalyst A feed rate (mol/min) | 9.418E−08 | 7.535E−08 | 5.651E−08 | 4.709E−08 | 1.884E−08 |
| Catalyst B feed rate (mol/min) | 2.203E−08 | 3.305E−08 | 4.406E−08 | 4.957E−08 | 6.609E−08 |
| Molar ratio of Catalyst A to Catalyst B | 4.28 | 2.28 | 1.28 | 0.95 | 0.29 |
| Polymer made (gram) | 178.6 | 168.3 | 158.8 | 156.1 | 140.1 |
| Conversion (%) | 69.8% | 65.8% | 62.1% | 61.0% | 54.8% |
| ML (1 + 4 at 125° C.) (mu) | 66.1 | 80.6 | 85 | 77.2 | 65.3 |
| MLRA (mu-sec) | 324.1 | 478.7 | 650.5 | 634.4 | 789.3 |
| cMLRA at 80 ML (mu-sec) | 427 | 474 | 596 | 668 | 1057 |
| Ethylene (wt %) | 58.2 | 59.78 | 61.9 | 62.81 | 66.09 |

Figure 12:
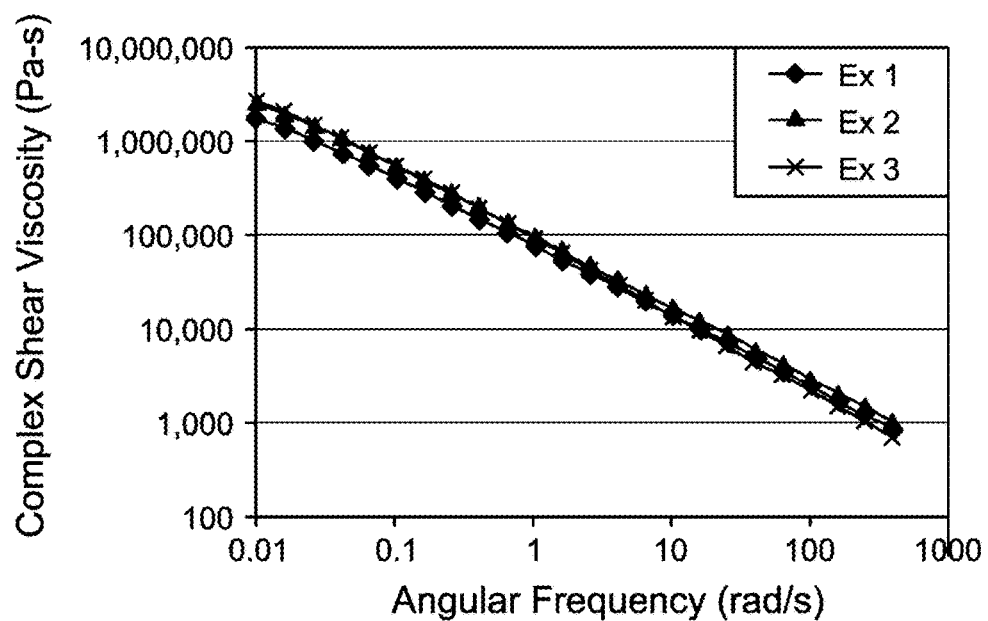
FIG. 12 is a plot of complex shear viscosity vs. angular frequency of certain compounds.

Example 4 is a comparative example and was made with a single catalyst of [di(p-triethylsilylphenyl)methylene] (cyclopentadienyl) (2,7-di-tert-butylfluoren-9-yl)hafnium dimethyl in a single reactor. The complex viscosity of the polymers produced in examples 1-4 were measured at a temperature of 190° C. over an angular frequency ranging from 0.01 to 398 rad/s, with values reported at 0.1 and 100 rad/s in Table 1. Significant shear thinning was observed for the inventive material. The ratio of the complex viscosity at a frequency of 0.1 rad/s to the complex viscosity at a frequency of 100 rad/s was 161, 193 and 244, respectively for examples 1, 2 and 3. The degree of shear thinning of these EPM copolymers is comparable to that of EPDMs with VNB as a cross linking agent. Another unique feature of the inventive examples is the factor of high shear viscosity at low frequency and low shear viscosity at high frequency, as shown in FIG. 12, which illustrates a plot of complex shear viscosity vs. angular frequency at 190° C. for Examples 1-3. This feature is of particular benefit for sponge/foam applications.

Figure 13:
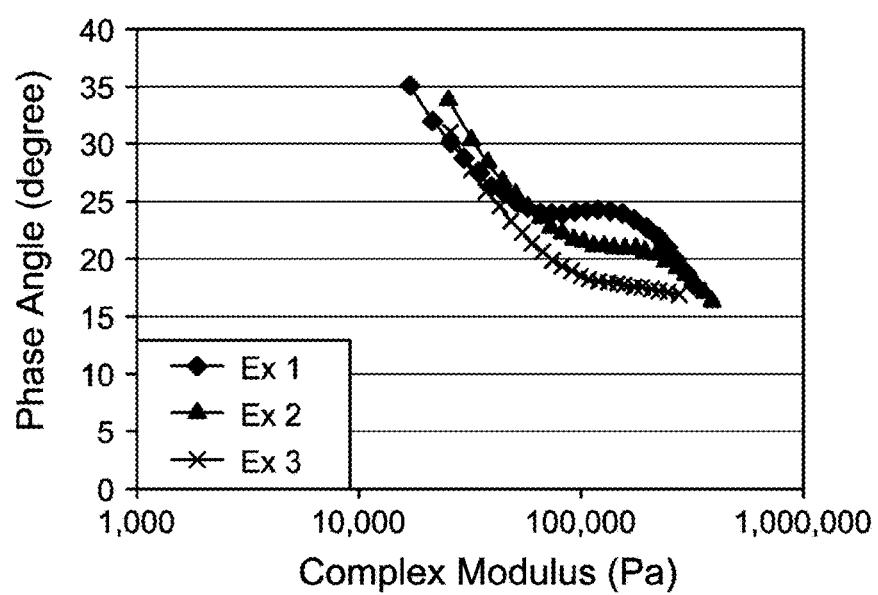
FIG. 13 is a Van Gurp-Palmen plot of complex shear modulus vs. phase angle of certain compounds.

The Van Gurp-Palmen plots (complex shear modulus vs. phase angle) (M. van Gurp, J. Palmen, Rheol. Bull., 67, pp 5-8, 1998) of the inventive ethylene copolymer produced in Examples 1-3 are shown in FIG. 13. The relationship between phase angle and complex shear modulus is similar to that of long chain branched EP rubbers produced by conventional Ziegler-Natta processes. The phase angle is low across the wide range of complex modulus.

Example 2 was also subjected to the analysis of large amplitude oscillatory shear using a rubber process analyzer (RPA) at temperature of 125° C. and 150° C. Low phase angle and high shear thinning was also observed from RPA analysis. The LCB index of Example 2 is 1.7 at 125° C., and 1.5 at 150° C. This low value is comparable to that of a linear or lightly branched polymer.

The Mooney and MLRA data are included in Table 1. High MLRA is observed for all inventive examples. This is another measure of high elastic performance. Similarly, cMLRA data are included in Table 1, indicating a similar trend of high elastic performance of the inventive examples.

Figure 14A:
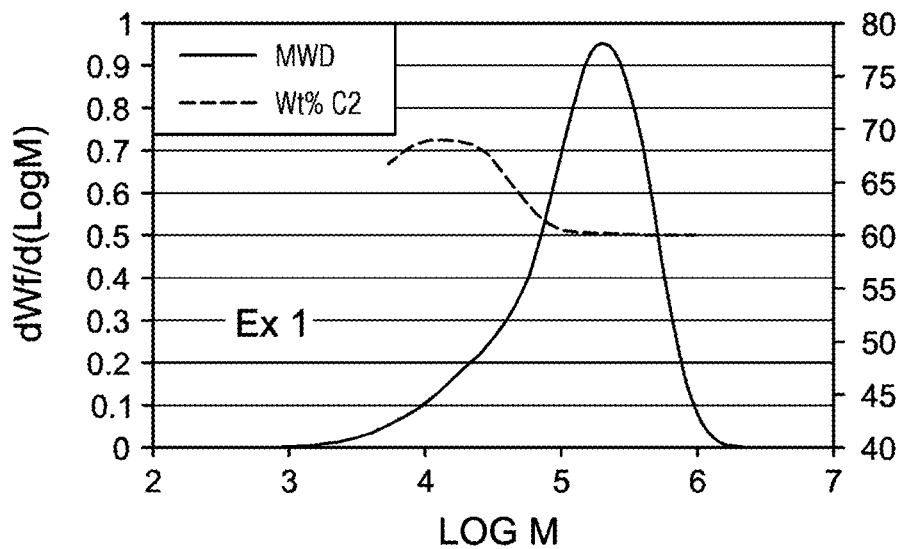
FIGS. 14a and 14b are plots of weight average molecular weight and composition distributions along molecular weight for certain example embodiments.
Figure 14B:
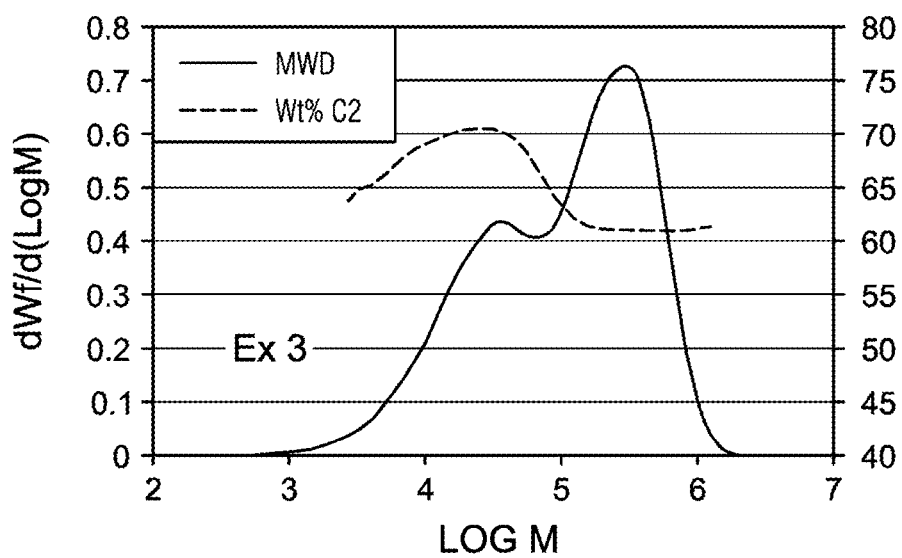

GPC-IR analysis of Examples 1 and 3 indicates that the in-reactor blends of these examples appear to be bimodal in both the molecular weight distribution and composition distribution. Distribution profiles for Examples 1 and 3 are shown in FIGS. 14a and 14b. According to the catalyst kinetics, it is thought that the lower molecular weight and higher ethylene fraction is derived from the catalyst of rac-cyclotetramethylenesilylene-bis(2,4,7-trimethylinden-1-yl)hafnium dimethyl (Catalyst B), while the higher molecular weight and lower ethylene fraction is derived from [di(p-triethylsilylphenyl) methylene](cyclopentadienyl) (2,7-di-tert-butylfluoren-9-yl)hafnium dimethyl catalyst (Catalyst A). The difference in ethylene content between these two fractions is about 10 wt %. These examples demonstrate that a heterogeneous in-reactor blend can be produced using dual catalysts in a single reactor. Broader molecular weight distribution (Mw/Mn) is also observed from GPC-3D analysis. The blends produced in Examples 1-3 have an Mw/Mn of greater than 4.0 while the comparative example (4) made using a single catalyst under similar polymerization condition has a MWD of 2.2.

Examples 10-14

Examples 10-14 were made under the similar condition used for Examples 1-9 except 5-ethylidene-2-norbornene (ENB) was introduced into the reactor as a diene for terpolymerization. ENB was obtained from Sigma-Aldrich and was purified by first passing through an alumina column activated at high temperature under nitrogen, followed by a molecular sieve activated at high temperature under nitrogen. ENB was diluted with isohexane and fed into the reactor using a metering pump. The recovered samples were stabilized using about 1000 ppm of Irganox 1076™ available from Ciba-Geigy, prior to any analytical test. Detailed process condition and some analytical data are listed in Table 2.

TABLE 2

Polymerization condition and some analytical data for EPDM

| Example # | 10 | 11 | 12 | 13 | 14 |
|---|---|---|---|---|---|
| Polymerization temperature (° C.) | 120 | 120 | 120 | 110 | 100 |
| Ethylene feed rate (SLPM) | 6 | 6 | 6 | 6 | 6 |
| Propylene feed rate (g/min) | 6 | 6 | 6 | 6 | 6 |
| ENB feed rate (g/min) | 1.00 | 2.00 | 2.00 | 2.00 | 2.00 |
| Catalyst A feed rate (mole/min) | 1.130E−07 | 1.601E−07 | 1.601E−07 | 1.601E−07 | 1.601E−07 |
| Catalyst B feed rate (mole/min) | 6.609E−08 | 9.363E−08 | 9.363E−08 | 9.363E−08 | 9.363E−08 |
| Isohexane feed rate (g/min) | 82.7 | 82.7 | 82.7 | 82.7 | 82.7 |
| Yield (g/min) | 6.8 | 6.23 | 5.29 | 5.26 | 4.59 |
| Conversion (%) | 53.2% | 48.7% | 36.3% | 36.1% | 31.5% |
| ML (1 + 4 at 125° C.) (mu) | 52.2 | 42 | 65.1 | 139.6 | 123.8 |
| Complex shear viscosity at 0.1 rad/sec and 190° C. (Pa s) | 609,037 | 402,134 | 706,748 | 1,098,265 | 1,325,260 |
| Complex shear viscosity at 100 rad/sec and 190° C. (Pa s) | 2,904 | 2,082 | 3,212 | 5,546 | 7,953 |
| Phase angle at G* = 100,000 Pa (degree) | 21.9 | 21.3 | 21.2 | 24 | 29.5 |
| MLRA (mu-sec) | 738.5 | 574.6 | 954.7 | 2137.1 | 3748.2 |
| cMLRA at 80 ML (mu-sec) | 1366 | 1453 | 1285 | 959 | 1999 |
| MST (5 + 4 at 200° C.) (mu) | | | | 46.9 | 74.7 |
| Mn_DRI (g/mol) | 24,281 | 25,815 | 26,513 | 61,179 | 89,655 |
| Mw_LS (g/mol) | 203,218 | 214,702 | 218,336 | 304,868 | 415,753 |

TABLE 2-continued

Polymerization condition and some analytical data for EPDM

| Example # | 10 | 11 | 12 | 13 | 14 |
|---|---|---|---|---|---|
| Mz_LS (g/mol) | 449,173 | 522,479 | 547,973 | 623,510 | 808,795 |
| Ethylene content (wt %) | 71.5 | 72.3 | 67.66 | 66.49 | 72.53 |
| ENB content (wt %) | 3.3 | 5.45 | 6.31 | 7.1 | 7.56 |

Example 11 was also subjected to RPA analysis at a strain of 14% and temperatures of 125° C. and 150° C. A low phase angle of 23.4 degree at complex modulus of 100,000 Pa was obtained when shear rheology was measured at 125° C. The ratio of the complex viscosity at a frequency of 0.1 rad/s to the complex viscosity at a frequency of 100 rad/s was about 200. The LCB index is 2.2 at 125° C., and 2.5 at 150° C.

The Mooney viscosity values of Example 13 and 14 exceeded the upper limit (~100 Mooney unit) of the Mooney viscometer. Therefore, MST was used for Mooney viscosity, as described above. GPC-3D was used to analyze the molecular weight distribution and a bimodal molecular weight distribution was observed for these examples.

These examples demonstrate that the high elastic and high shear thinning product can be produced without using diene with at least two polymerizable bonds. One of the advantages of the inventive process is to produce gel-free high melt elasticity and high shear thinning product. These polymers demonstrate the unique polymer property combination of high melt elasticity, high shear thinning and lack of cross-linked architecture.

Figure 15:
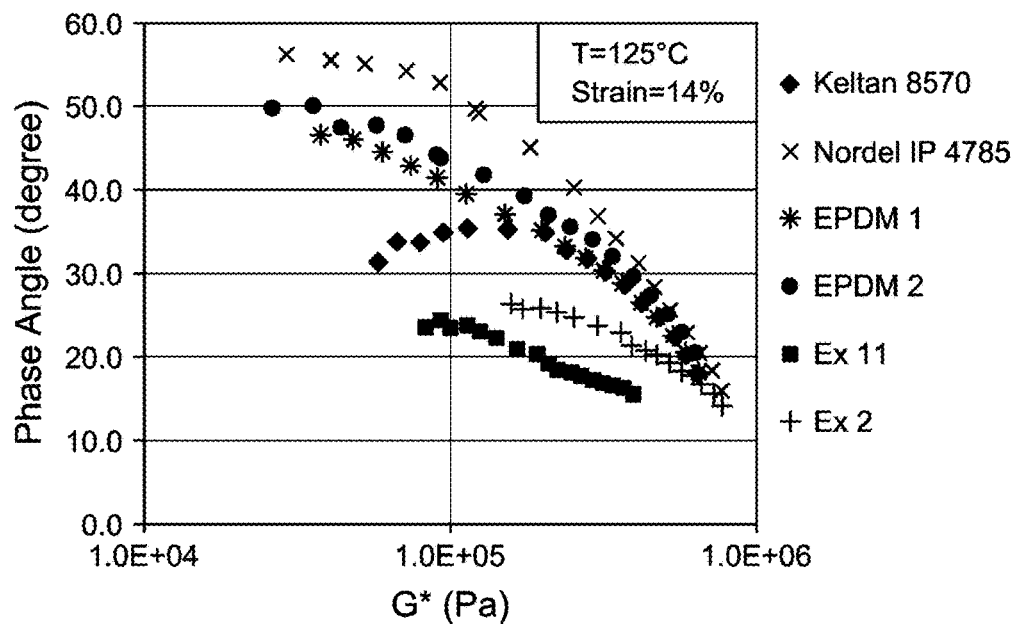
FIG. 15 is a plot of phase angle vs. complex modulus for various polymer compositions.

In addition, FIG. 15 shows a plot of phase angle vs. complex modulus (125° C., strain at 14%) for polymer blends produced in inventive Examples 2 (EP copolymer) and 11 (EPDM terpolymer) as compared to commercially available Keltan™ 8570, Nordel™ IP 4785, EPDM 1 and EPDM 2. As can be seen, the inventive EP and EPDM copolymers exhibited substantially lower phase angle at each point of complex modulus as compared to the commercial copolymers. The inventive examples 2 and 11 also show tan delta less than 0.5 throughout the entire frequency range. The comparative commercial products all have tan delta greater than 0.5. EPDM 1 and EPDM 2 are commercially available EPDM terpolymers. Keltan™ 8570 is EPDM with medium ENB content and high Mooney viscosity (80 mu), available from Lanxess Corporation, 8500 W. Bay Rd., Baytown, Tex. Nordel™ IP 4785 is EPDM with high ethylene content and high Mooney viscosity, available from Dow Chemical Company, 2301 Brazosport Blvd., Freeport, Tex. 77541.

Examples 15-18

Examples 15-18 are EP copolymers (e.g., formed by copolymerizing ethylene and propylene). Examples 15-18 demonstrate a polymerization process in two reactors in series configuration. The reactor system was similar to that used for Examples 1-9, except that two Autoclave reactors were used. The first Autoclave reactor is 0.5 liter while the second one is 1.0 liter. In this process, ethylene, propylene along with activated Catalyst B were fed into the first reactor, and relatively low molecular weight ethylene copolymer was produced in the first reactor. The content of the first reactor then flowed into the second reactor. A small sample was taken from the first reactor for characterization. Activated Catalyst A was fed into the second reactor. Polymerization in the second reactor took place in the presence of the ethylene copolymer produced in the first reactor. The polymer composition from the second reactor was recovered and analyzed. The detailed process conditions and some analytical data are listed in Table 3.

TABLE 3

Polymerization conditions and some analytical data for EPM in series reactors

| Example # | 15 | 16 | 17 | 18 |
|---|---|---|---|---|
| Polymerization condition in Reactor # 1 | | | | |
| Polymerization temperature in 1st reactor (° C.) | 120 | 120 | 120 | 120 |
| Ethylene feed rate to 1st reactor (SLPM) | 6 | 6 | 6 | 6 |
| Propylene feed rate to 1st reactor (g/min) | 6 | 6 | 6 | 6 |
| Isohexane feed rate to 1st reactor (g/min) | 42.7 | 42.7 | 42.7 | 42.7 |
| Catalyst B feed rate to 1st reactor (mole/min) | 2.754E−08 | 2.754E−08 | 2.754E−08 | 2.754E−08 |
| Yield from reactor #1 (g/min) | 4.6 | | 2.06 | |
| Ethylene content (wt %) | 75.6 | | 77.1 | |
| Polymerization condition in Reactor #2 | | | | |
| Polymerization temperature in 2nd reactor (° C.) | 120 | 120 | 120 | 120 |
| Catalyst A feed rate to 2nd reactor (mole/min) | 4.709E−08 | 7.53E−08 | 9.42E−08 | 1.41E−07 |
| Isohexane feed rate to 2nd reactor (g/min) | 40 | 40 | 40 | 40 |
| Yield (g/min) | 7.7 | 8.8 | 7.7 | 9.1 |
| Conversion (%) | 60.5% | 68.4% | 60.3% | 71.4% |
| Ethylene content (wt %) | 67.95 | 66.29 | 67.15 | 65.47 |
| ML (1 + 4 at 125° C.) (mu) | 74.2 | 74 | 93.5 | 69.3 |

TABLE 3-continued

Polymerization conditions and some analytical data for EPM in series reactors

| Example # | 15 | 16 | 17 | 18 |
|---|---|---|---|---|
| MLRA (mu-sec) | 1018.2 | 870.3 | 529.6 | 425.4 |
| cMLRA at 80 ML (mu-sec) | 1135 | 974 | 423 | 523 |

The final product exiting from the second reactor was analyzed for Mooney viscosity. High Mooney and high MLRA ethylene copolymers were produced in the process. A number of process variables can be used to tune the polymer properties in each reactor and the ratio of polymer production between the two reactors.

Examples 19-24

Examples 19-24 are also EP copolymers, made under similar conditions used for Examples 1-9, except that only Catalyst B was used in the polymerization. Detailed process conditions and some analytical data are listed in Table 4. The catalyst feed rate for each polymerization run can be adjusted in order to reach the conversion listed in Table 4. These ethylene copolymers were subjected to $^1$H NMR analysis for unsaturated chain ends (vinyl terminations) in accordance with the above description. These examples demonstrate that the ethylene copolymer derived from metallocene catalyst rac-cyclotetramethylenesilylene-bis(2,4,7-trimethylinden-1-yl)hafnium dimethyl (Catalyst B) has high level of vinyl chain ends.

used as an additional diene monomer where indicated. The molar ratio of catalyst A to catalyst B was varied from 1.5 to 6.0 respectively, as indicated for each Example 25-32 in Table 5 below. Ethylene conversion ranged from 40% to 90%, propylene conversion from 18% to 60% and ENB conversion from 3% to 5% respectively in the inventive Examples 25 through 32, as also shown in Table 5. The examples where the ENB conversion is not specified correspond to copolymers of ethylene and propylene. Examples 25-32 were made under similar conditions used for Examples 1-9, with the following differences. The reactor temperature was maintained at 120° C. and pressure was maintained at about 2.2 MPag for all the reactions. The isohexane stream was not prechilled, nor was the scavenger feed rate varied. Further, antioxidant (Irganox 1076) was added to the collected samples as a stabilizer for the polymer products, and the majority of solvent was removed by heating the effluent on a steam table, followed by drying in a vacuum oven as described regarding Examples 1-9.

TABLE 4

Polymerization condition and some analytical data for EPM with vinyl chain end

| | Example # | | | | | |
|---|---|---|---|---|---|---|
| | EP#19 | EP#20 | EP#21 | EP#22 | EP#23 | EP#24 |
| Polymerization temperature (° C.) | 100 | 100 | 100 | 120 | 120 | 120 |
| Catalyst B feed rate (mol/min) | 4.406E-08 | 4.406E-08 | 4.406E-08 | 4.406E-08 | 4.406E-08 | 4.406E-08 |
| Ethylene feed rate (SLPM) | 6 | 6 | 6 | 6 | 6 | 6 |
| Propylene feed rate (g/min) | 6 | 8 | 10 | 6 | 8 | 10 |
| Isohexane feed rate (g/min) | 82.7 | 82.7 | 82.7 | 82.7 | 82.7 | 82.7 |
| Conversion (%) | 61.9% | 56.4% | 53.3% | 67.0% | 60.5% | 55.8% |
| ML (1 + 4 at 125° C.) (mu) | | | | <5 | | |
| Mw/Mn (—) | 4.46 | 4.36 | 3.44 | 4.78 | | |
| Mn_DRI (g/mol) | 20,876 | 20,434 | 22,054 | 7,257 | | |
| Mw_LS (g/mol) | 98,599 | 85,720 | 79,707 | 34,025 | | |
| Mz_LS (g/mol) | 199,801 | 164,733 | 166,534 | 86,150 | | |
| g'$_{vis}$ (—) | 0.827 | 0.831 | 0.85 | 0.905 | | |
| Ethylene content (wt %) | 61.52 | 55.61 | 51.27 | 64.12 | 46.34 | |
| Vinyl chain end (%) | 75.9% | 83.3% | 88.6% | 84.1% | 81.1% | 81.6% |

Thus, a unique feature of compositions according to some embodiments is the presence of a copolymer (e.g., an ethylene copolymer) having a high degree of vinyl terminations. Branching index, g'$_{vis}$ of these samples are less than 0.906, indicating the presence of LCB structures.

Examples 25-32

Examples 25-32 were made using ethylene and propylene monomers, with the to additional notation that ENB was The comparative Example C1 of Table 5 is a polymer that is synthesized using only Catalyst A. Other detailed polymerization process conditions and some analytical data are listed in Table 5. The catalyst feed rate can be adjusted to reach the targeted monomer conversion. The comparative Examples C2 and C3 are commercially available EPDM terpolymers (Vistalon™ EPDM rubbers, grades 7500 and 8600, respectively) with a highly branched architecture, synthesized using conventional Vanadium catalyst and aluminum alkyl catalyst.

TABLE 5

Polymerization condition and some analytical data for EP and EPDM

| | Example # | | | | |
|---|---|---|---|---|---|
| | 25 | 26 | 27 | 28 | 29 |
| Catalyst A feed rate (mol/min) | 7.53E−08 | 7.06E−08 | 7.06E−08 | 7.06E−08 | 7.06E−08 |
| Catalyst B feed rate (mol/min) | 4.41E−08 | 4.13E−08 | 1.65E−08 | 1.65E−08 | 1.79E−08 |
| Catalyst A/Catalyst B in feed | 1.71 | 1.71 | 4.27 | 4.27 | 3.95 |
| Ethylene conversion (wt %) | 90.2% | 48.4% | 90.7% | 40.6% | 87.6% |
| Propylene conversion (wt %) | 18.1% | 59.1% | 29.5% | 21.6% | 21.6% |
| ENB conversion (wt %) | | 3.0% | | | |
| Ethylene content (wt %) | 65.9% | 73.9% | 68.9% | 74.9% | 69.3% |
| ENB content (wt %) | 0.0% | 4.2% | 0.0% | 6.4% | 0.0% |
| ML (1 + 4 at 125° C.) (mu) | 54.3 | 20.9 | 52.3 | 89.2 | 49.5 |
| MLRA (mu.sec) | 281 | 281 | 288 | 1021 | 130 |
| cMLRA at 80 ML (mu.sec) | 490 | 1944 | 532 | 873 | 260 |
| LCB index (125° C.) | 2.3 | 3.5 | 2 | 1.8 | 2.1 |
| tan delta at 125° C. and 0.245 rad/s (—) | 0.63 | 0.55 | 0.7 | 0.61 | 1.12 |
| Phase angle at $G^* = 100{,}000$ Pa (degree) | 31.9 | 21.7 | 33.3 | 32.8 | 46 |
| Shear thinning index (—) | 0.994 | 0.996 | 0.993 | 0.996 | 0.983 |
| Relaxation time $\tau$ (sec) | 80.4 | 110.1 | 46.7 | 22.4 | 8.3 |
| Mn_DRI | 38,922 | 7,170 | 34,207 | 13,483 | 78,671 |
| Mw_LS | 165,345 | 169,390 | 163,718 | 265,438 | 182,661 |
| Mw/Mn | 4.25 | 23.62 | 4.78 | 19.68 | 2.32 |
| Mz/Mw (Mz by LS) | 1.77 | 6.15 | 1.74 | 3.52 | 1.63 |

| | Example # | | | | | |
|---|---|---|---|---|---|---|
| | 30 | 31 | 32 | C1 | C2 | C3 |
| Catalyst A feed rate (mol/min) | 7.06E−08 | 7.06E−08 | 7.06E−08 | | | |
| Catalyst B feed rate (mol/min) | 1.79E−08 | 1.51E−08 | 1.24E−08 | | | |
| Catalyst A/Catalyst B in feed | 3.95 | 4.66 | 5.70 | | | |
| Ethylene conversion (wt %) | 45.5% | 37.2% | 45.8% | 60.1% | | |
| Propylene conversion (wt %) | 62.1% | 30.1% | 33.7% | 38.5% | | |
| ENB conversion (wt %) | 4.7% | 3.1% | 4.8% | 19.2% | | |
| Ethylene content (wt %) | 70.0% | 74.7% | 74.8% | 68.7% | 55.5% | 57.5% |
| ENB content (wt %) | 6.4% | 5.5% | 6.9% | 7.2% | 5.7% | 8.9% |
| ML (1 + 4 at 125° C.) (mu) | 60.7 | 69.4 | 98.8 | 84.3 | 91 | 90 |
| MLRA (mu.sec) | 570 | 829 | 1030 | 263 | 790 | 770 |
| cMLRA at 80 ML (mu) | 848 | 1018 | 760 | 244 | 656 | 650 |
| LCB index (125° C.) (—) | 0.8 | 1.8 | 1.4 | | 7 | 6.1 |
| tan delta at 125° C. and 0.245 rad/s (—) | 0.54 | 0.54 | 0.68 | 1.74 | 0.6 | 0.58 |
| Phase angle at $G^* = 100{,}000$ Pa (degree) | 25.5 | 27.7 | 35.6 | 54.8 | 31.7 | 31.5 |
| Shear thinning index (—) | 0.996 | 0.996 | 0.996 | 0.978 | 0.994 | 0.994 |
| $\tau$ (sec) | 41 | 97.6 | 15.8 | 1.4 | 81.8 | 54.3 |
| Mn_DRI | 25,518 | 22,333 | 33,648 | | | |
| Mw_LS | 245,988 | 267,078 | 301,327 | | | |
| Mw/Mn | 9.6 | 12 | 9 | | | |
| Mz/Mw (Mz by LS) | 3 | 4.1 | 3.3 | | | |

Mooney viscosity and MLRA for Examples 25-32 are measured using a Mooney viscometer operated at an average shear rate of 2 s-1, according to the modified ASTM D1646 test procedure described earlier, and the results are listed in Table 5.

cMLRA data are also listed in Table 5. As noted previously, cMLRA can be regarded as a stored energy term, which suggests that after removal of the applied strain, the longer or branched polymer chains store more energy and would require a longer time to relax. The cMLRA values for a bi-modal or a branched polymer are typically higher than that to of a linear polymer or mixtures thereof. From Table 5, it is evident that all the inventive polymers of Examples 25-32, have a cLMRA higher than that of comparative Example C1. Furthermore, some of the inventive polymer samples possess a cMLRA value higher than that of the commercial EPDM polymer of comparative Examples C2 and C3, respectively. The data demonstrates the successful synthesis of metallocene-based EP and EPDM having the desirable processability of Ziegler-Natta-catalyzed copolymers.

LCB index for Examples 25-32, C2 and C3 were calculated and the results are listed in Table 5. The LCB index of the inventive polymers are lower compared to the commercial EPDM polymers (Example C2 and C3), which is in contrast to the higher cMLRA values seen in Table 5 with respect to Examples C2 and C3. This result is surprising, because one would normally expect a polymer having higher cMLRA to also have higher LCB index, because cMLRA normally indicates a greater degree of long-chain branching (as does higher LCB index). It is speculated that the LCB index in this instance is influenced by the specific nature of the branch topology. In other words, it appears that the inventive polymer compositions exhibit a unique branch topology that is different than conventional Examples C2 and C3—for instance, comparative Examples C2 and C3 are suspected to possess a tetra-functional branch points (H-type branches), while the inventive examples may have a tri-function, or T-type, branch structure. One reason for this is that the LAOS-based LCB index may not account for the full degree of branching in a tri-function, or T-type, branched polymer, whereas the cMLRA is not sensitive to branching type.

Table 5 also shows SAOS data on Examples 25-32 and comparative Examples C1, C2 and C3 respectively. The tangent of the phase angle [tan δ=tan(G"/G')] is provided from measurements at 125° C. and a low frequency of 0.245 rad/s. As discussed earlier, with higher degree of branching, G' increases owing to slower relaxation of the polymer chains, with the results tan δ will be lower when compared to a linear polymer. Comparative Example C1, which is presumed to be predominantly linear, has the highest tan δ. The inventive examples have a lower tan δ compared to C1, and in several instances (Examples 25, 26, 30, and 31) are comparable to the highly branched commercial EPDM samples shown in comparative Examples C2 and C3 respectively.

Figure 16:
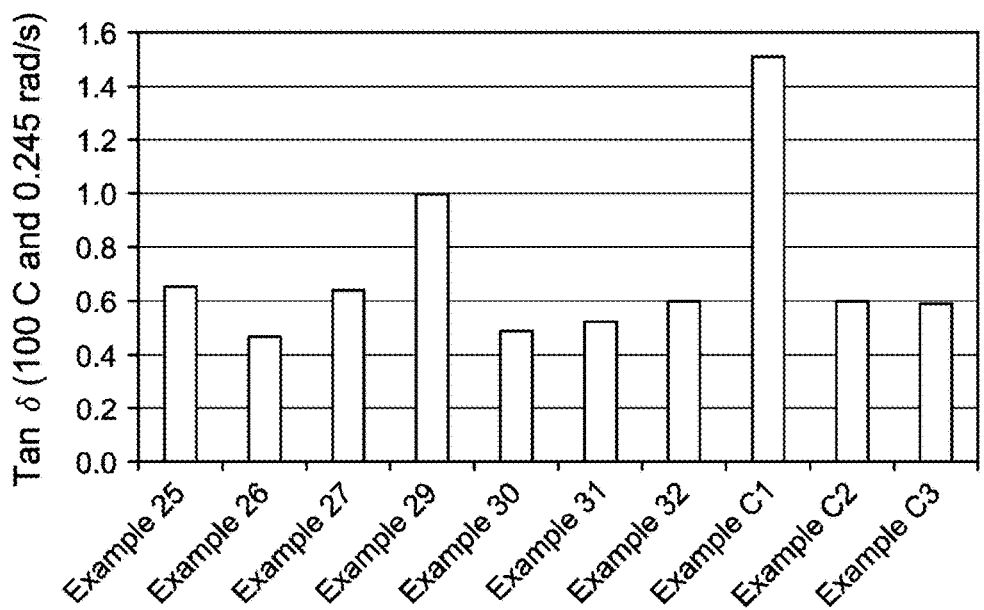
FIG. 16 is a graph showing values of tan δ for certain polymer compositions.

In addition, FIG. 16 shows the tan δ determined from data obtained at 100° C. (rather than the 125° C. indicated in Table 4), with all other parameters the same. Similar to the trends observed at 125° C., the tan δ values for the inventive Examples 25-27 and 29-32 are lower relative to comparative Example C1 and in several cases comparable to Examples C2 and C3, respectively.

The plot of the phase angle (δ) versus the complex modulus (G*) is known as the Van Gurp Palmen plot (M. van Gurp, J. Palmen, Rheol. Bull., 67, pp 5-8, 1998). The phase angle was calculated at a G* of $10^5$ Pa for each of the polymers shown in Table 5. The plot of δ versus log (G*) was fitted to a third degree polynomial using the Least Squares method ($R^2$>0.95), and the polynomial equation was used to calculate δ at the specified G* value (e.g., $10^5$ Pa). The phase angle will decrease with higher degree of branching or increased polydispersity. From Table 5, we observe that the phase angle for the comparative Example C1 is 54.8 degree. All the inventive polymers have a phase angle lower than the comparative Example C1. Furthermore, in Examples 25, 26, 30, and 31, the phase angle is comparable to the comparative Examples of C2 and C3 respectively.

Figure 17:
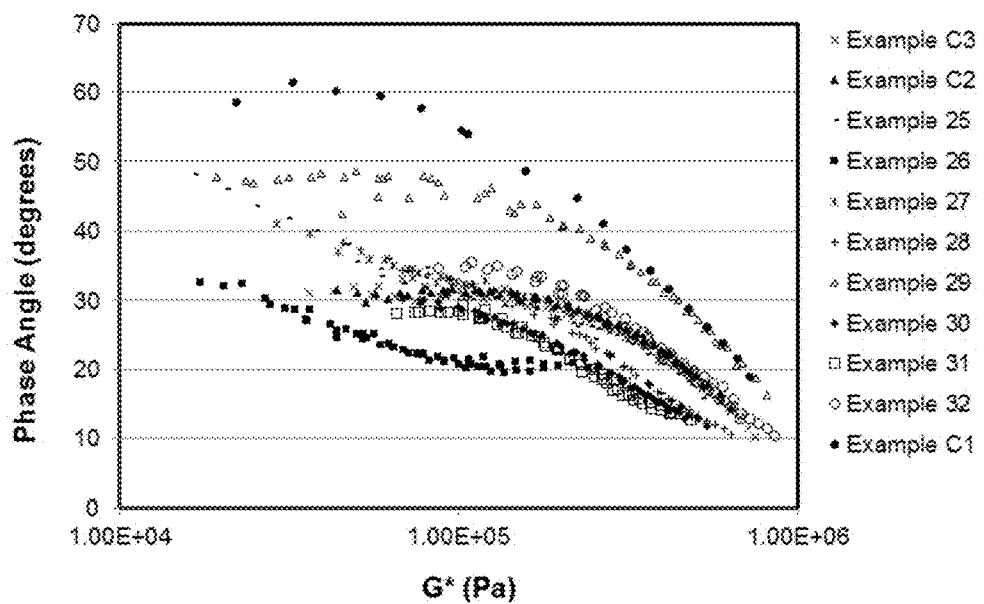
FIG. 17 is a Van Gurp-Palmen plot of complex shear modulus vs. phase angle of certain compounds.

FIG. 17 shows the van Gurp-Palmen plot for the inventive and comparative examples of Table 5. The plot was constructed from data obtained at both 100° C. (as shown in FIG. 15) and 125° C. (as shown in Table 5). The data was subjected to a time-temperature superposition using the free shift protocol provided by IRIS® Rheo-hub 2012 rheology software and condensed to a master curve at 125° C. Increased level of branching is normally associated with lower phase angle (S. G. Hatzikriakos, Polymer Engineering and Science, 40 (11), 2000, 2278-2287), which is evident in Examples 25-32 relative to comparative Example C1 across all G* values. The shape of the van-Gurp Palmen plot can be influenced by the branch topology (Lohse, D. J. et. al., Macromolecules, 35, 2000, 3066-3075), where differences are seen between star, comb and linear polymers. In FIG. 17 for instance, Examples 26, 28, and 31 show lower phase angle relative to commercial EPDM samples of C2 and C3 respectively across all G* values; and in addition are shifted laterally along the G* axis, further leading one to speculate that the branch topology could be different relative to commercially available EPDMs (see discussion above). Lateral shifts along the G* axis are also associated with compositional changes such as from varying ethylene content in the polymer (C. A Garcia-Franco, et. al. Macromolecules, 39, 2006, 2710-2717). Some of the lateral shift seen in Examples 26, 28, and 31 could therefore also be attributed to the higher ethylene content in these polymers relative to the commercial EPDM samples.

Table 5 also shows the shear thinning index (STI) calculated for each polymer. Comparative Example C1 has the lowest STI. All of inventive examples have a higher STI relative C1 and comparable with comparative Example C2 and C3 respectively. The relaxation time, τ calculated using the Cross model is also higher in the inventive examples compared to comparative Example C1. Example 7 has a higher relaxation time in comparison to comparative Examples C2 and C3, directionally indicative of higher branching.

Compounded Copolymer Rheology—Small Amplitude Oscillatory Shear

Standard EPDM compound formulations containing carbon black, oil and curatives were prepared in a 410 ml Banbury® Mixer to form Examples C2.1, C3.1, 30.1, and 32.1, made from polymers according to examples C2, C3, 30, and 32, respectively. Table 6 shows the representative EPDM formulation (with "polymer" representing the C2, C3, 30, or 32 for each respective example). Cut polymer pieces of each of Examples 30, 32, C2, and C3 were respectively first introduced into the chamber of the Banbury mixer for each example run. Carbon black, oil, stearic acid and sulfur were gradually added and the ram lowered after complete addition. After homogenization of each mixture, the rpm (mixing intensity) was decreased and mixing was continued for a further 3 minutes. At the end of 3 minutes, the Banbury doors were opened and the batch discharged. About 5 gm of the compound master batch was isolated for rheology measurements. The curatives were added to the compound master batch in a two-roll mill. The compound containing the curatives was press cured at 180° C. for about 7 minutes and tested for physical properties.

TABLE 6

| Polymer | 100 |
| Carbon Black N550 | 130.0 |
| Sunpar ™ 2280 | 70.0 |
| Zinc Oxide | 5.0 |
| Stearic Acid | 1.0 |
| Sulphur | 0.1 |
| Mill Addition Entire Batch | |
| Sulfur | 1.1 |
| ZBEC (70% active) | 1.5 |
| MBTS (80%) | 1.5 |
| Rhenocure ™ ZADT/G (50% ACTIVE) | 1.54 |
| Rhenocure ™ TP/G (50% ACTIVE) | 1.8 |
| Specific Gravity | 1.14 g/cm$^3$ |
| Total PHR master batch | 306.0 |
| Total PHR compound | 313.5 |
| Batch Factor | 1.05 |
| Fill (%) | 70 |
| Batch wt. (gm) | 327.7 |

*Unless otherwise noted, all values are in phr (parts per hundred parts resin), based on the addition of 100 parts polymer as indicated.

In Table 6, Carbon Black N550 is carbon black. Sunpar™ 2280 is a paraffinic processing oil; Zinc Oxide is Zinc Oxide; ZBEC is zinc di-benzyl dithiocarbamate; MBTS is 2-mercaptobenzothiazole disulfide; Rhenocure™ ZADT/G is zinc amine dithiophosphate (50% active ingredient), commercially available from RheinChemie; Rhenocure™ TP/G is zinc dialkyl dithiophosphate containing 50% active ingredient, commercially available from RheinChemie. Batch Factor is a sizing factor useful in converting the above recipe (in phr) to weight of ingredients for use in compounding. Specifically, the phr of each ingredient is multiplied by the batch factor to provide the weight of that ingredient to be used in the compounding.

Small Amplitude Oscillatory Shear (SAOS) measurements were carried out using the ATD® 1000 Rubber Process Analyzer from Alpha Technologies on the compound master batch formulations that did not yet contain any curing agents. A sample of approximately 4.5 gm weight is mounted between the parallel plates of the ATD® 1000. The test temperature is 100° C., the applied strain is 14% and the frequency was varied from 0.1 rad/s to 200 rad/s. The complex modulus (G*), complex viscosity ($\eta$*) and the phase angle ($\delta$) are measured at each frequency.

Table 7 lists tan $\delta$ of the compound master batch measured at 0.245 rad/sec and 100° C. Comparative Examples C2.1 and C3.1 containing the commercial EPDM polymers are contrasted with formulations 30.1 and 32.1, containing the inventive Examples 30 and 32 respectively. For profile extrusion such as in hose and weather strip applications, a lower tan $\delta$ is desirable for properties such as collapse resistance. The data in Table 7 show that the inventive Examples have a lower tan $\delta$ compared to the comparative formulations.

TABLE 7

| Example | polymer | Compound tan delta (100° C. and 0.245 rad/s) |
|---|---|---|
| C2.1 | Example C2 | 0.725 |
| C3.1 | Example C3 | 0.782 |
| 30.1 | Example 30 | 0.616 |
| 32.1 | Example 32 | 0.629 |

Figure 18:
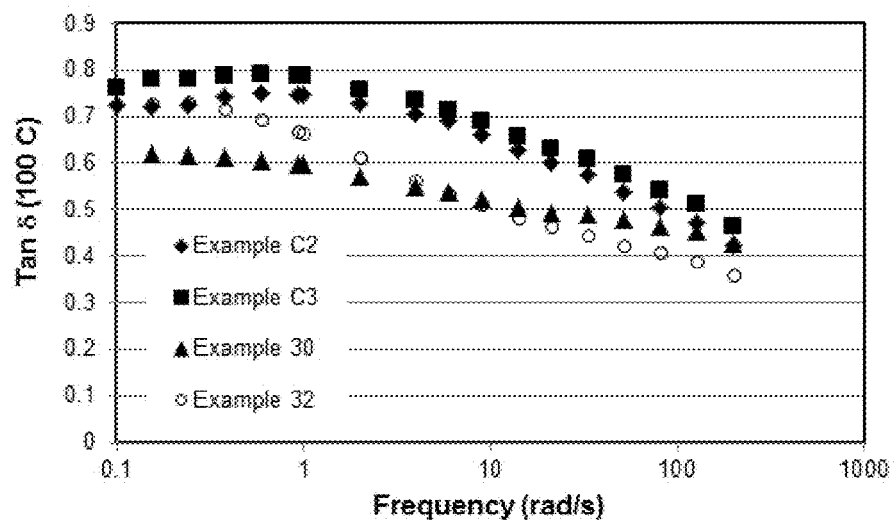
FIG. 18 is a plot of tan δ versus frequency for certain master batch compounds.
Figure 19:
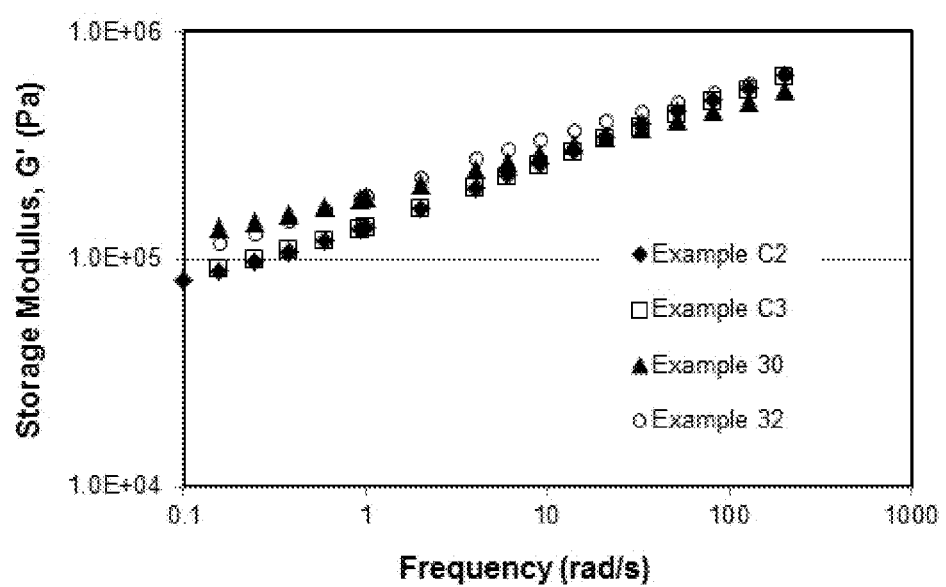
FIG. 19 is a plot of storage modulus (G") versus frequency for certain master batch compounds.

FIGS. 18 and 19 respectively show the plot of tan $\delta$ versus frequency and storage modulus (G') versus frequency for the master batch compounds. Inventive Examples 30.1 and 32.1 show lower tan $\delta$ and higher storage modulus (G') across the entire frequency range.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" to require the listed components without excluding the presence of any other additional components. Likewise whenever a composition, an element or a group of elements is preceded with the transitional phrase "comprising", it is understood that we also contemplate the same composition or group of elements further narrowed with more restrictive transitional phrases such as "consisting essentially of," "consisting of", "selected from the group of consisting of," or "is" preceding the recitation of the composition, element, or elements and vice versa.

What is claimed is:
1. A polymer composition comprising a reactor blend of:
(a) a first copolymer component comprising a vinyl-terminated polymer (VTP) having at least 60% vinyl terminations relative to the total number of end-group unsaturations in the VTP, and further having 40 to 80 wt % content derived from ethylene, 0 to 15 wt % content derived from one or more polyenes, with the balance of content derived from one or more $C_3$-$C_{12}$ $\alpha$-olefins; and
(b) a second copolymer component comprising a high molecular weight polymer (HMP) having 35-75 wt % content derived from ethylene, 0 to 15 wt % content derived from one or more polyenes, with the balance of content derived from one or more $C_3$-$C_{12}$ $\alpha$-olefins and having weight-average molecular weight of 50,000 g/mol or greater;
wherein the second copolymer component has weight-average molecular weight (Mw) greater than that of the first copolymer component, and further has at least 5 wt % less ethylene-derived content than the ethylene-derived content of the first copolymer component; and
further wherein the reactor blend is made by a polymerization process comprising:
copolymerizing a plurality of monomers comprising (i) ethylene, (ii) one or more $C_2$-$C_{12}$ $\alpha$-olefin monomers, and optionally; and (iii) one or more polyenes in the presence of a vinyl-terminated polymer-forming catalyst system ("VTP catalyst system") and a high molecular weight polymer-forming catalyst system ("HMP catalyst system"), thereby forming the reactor blend;
wherein:
(i) the HMP catalyst system comprises a HMP catalyst compound and a first activator;
(ii) the VTP catalyst system comprises a VTP catalyst compound and a second activator; and
(iii) the VTP catalyst compound has the structural formula:

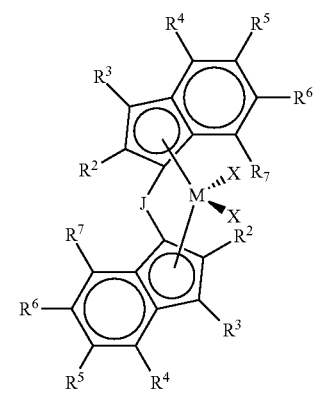

where: (1) J is a divalent bridging group comprising C, Si, or both;
(2) M is Hf; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may be bonded together to form a saturated or partially saturated cyclic or fused ring structure.

2. The polymer composition of claim 1, wherein the one or more $C_2$-$C_{12}$ α-olefin monomers are one or both of propylene and butene, and further wherein the optional polyenes are selected from the group consisting of 5-ethylidene-2-norbornene (ENB), 5-vinyl-2-norbornene (VNB), 1,4,-hexadiene, dicyclopentadiene, and any combination thereof, such that each of the first and second copolymer components each independently comprise content derived from (i) ethylene; (ii) propylene and/or butene, and, optionally; and (iii) one or more of ENB, VNB, 1,4-hexadiene, and dicyclopentadiene.

3. The polymer composition of claim 2, wherein each of the first and second copolymer components is an EPDM terpolymer.

4. The polymer composition of claim 1, wherein the copolymerizing takes place in a plurality of polymerization zones comprising at least a first polymerization zone and a second polymerization zone.

5. The polymer composition of claim 4, wherein the polymerization process comprises:
copolymerizing at least a first portion of the plurality of monomers in the first polymerization zone in the presence of the VTP catalyst system to provide a polymerization intermediate comprising the VTP of the first copolymer component; and
copolymerizing (i) the polymerization intermediate and (ii) optionally, a second portion of the plurality of monomers, in the presence of the HMP catalyst system in the second polymerization zone, thereby obtaining the reactor blend.

6. The polymer composition of claim 1, wherein, within the VTP catalyst compound,
(1) each $R^3$ is hydrogen; (2) each $R^4$ is independently a $C_1$-$C_{10}$ alkyl; (3) each $R^2$ and $R^7$ is independently hydrogen, or $C_1$-$C_{10}$ alkyl; (4) each $R^5$ and $R^6$ is independently hydrogen, $C_1$-$C_{50}$ substituted or unsubstituted hydrocarbyl, or $C_1$-$C_{50}$ substituted or unsubstituted halocarbyl; (5) $R^4$ and $R^5$, $R^5$ and $R^6$ and/or $R^6$ and $R^7$ may optionally be bonded together to form a ring structure; and (6) J is a divalent bridging group represented by the formula $R^a_2J'$, where J' is Si, and each $R^a$ is, independently, $C_1$ to $C_{20}$ substituted or unsubstituted hydrocarbyl, provided that the two $R^a$ are bonded together to form a saturated or partially saturated cyclic or fused ring structure that incorporates J'.

7. The polymer composition of claim 6, wherein the VTP catalyst compound comprises cyclotetramethylenesilylene-bis(2,4,7-trimethylinden-1-yl)hafnium dimethyl.

8. The polymer composition of claim 1, wherein the HMP catalyst compound is selected from mono-cyclopentadienyl amido group 4 transition metal complexes; mono-Cp amido variants; bridged fluorenyl-cyclopentadienyl group 4 transition metal complexes; Cp-fluorenyl variants; biphenyl phenol (BPP) transition metal complexes; pyridyl amide transition metal complexes; pyridyl diamide transition metal complexes; and any combination thereof.

9. The polymer composition of claim 1, wherein the reactor blend comprises 30 wt % to 60 wt % of the first copolymer component, the balance comprising the second copolymer component.

10. The polymer composition of claim 1, wherein the first copolymer component has a Mooney viscosity (1+4 at 125° C.) of 10 mu or less and the second copolymer component has a Mooney viscosity (1+4 at 125° C.) of 20 mu or more.

11. The polymer composition of claim 1, wherein the reactor blend has one or more of the following properties:
(i) corrected Mooney Large Relaxation Area (cMLRA) at Mooney Large Viscosity (ML)=80 Mooney Units (mu), such that cMLRA is from 240 to 2000 mu*sec, where ML is determined at (1+4@ 125° C.);
(ii) MLRA/ML ratio greater than R, where R is given as R=9.57(ML)−40.83, where ML is the Mooney Large Viscosity of the copolymer composition determined at (1+4@ 125° C.);
(iii) shear thinning index (STI) measured at 125° C. greater than 0.950;
(iv) a phase angle δ at complex shear modulus G*=100,000 Pa of less than 54.5°;
(v) Mw/Mn greater than or equal to 3.5;
(vi) LCB index measured at 125° C. of less than 5; and
(vii) relaxation time τ (determined at 125° C. using the Cross equation) of greater than 1.4 sec.

12. The polymer composition of claim 11, having both (iv) a phase angle δ at complex shear modulus G*=100,000 Pa of less than 54.5° and (vi) LCB index measured at 125° C. of less than 5.

13. The polymer composition of claim 1, wherein the second copolymer component comprises one or more HMP copolymers incorporating a VTP ("HMP-VTPs").

14. The polymer composition of claim 13, wherein the second copolymer component comprises either: (i) comb-type polymers with amorphous backbones and semi-crystalline branches and (ii) comb-type polymers with semi-crystalline backbones and amorphous branches.

15. The polymer composition of claim 1, further comprising one or more curing agents, such that the first EPDM copolymer and second EPDM copolymer are at least partially cross-linked.

* * * * *